(12) United States Patent
Suzuki et al.

(10) Patent No.: US 11,458,958 B2
(45) Date of Patent: Oct. 4, 2022

(54) DISPATCH SUPPORT METHOD AND DEVICE

(71) Applicant: Nissan Motor Co., Ltd., Yokohama (JP)

(72) Inventors: Yasuhiro Suzuki, Kanagawa (JP); Yasuhisa Hayakawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 338 days.

(21) Appl. No.: 16/329,684

(22) PCT Filed: Sep. 6, 2016

(86) PCT No.: PCT/JP2016/076118
§ 371 (c)(1),
(2) Date: Feb. 28, 2019

(87) PCT Pub. No.: WO2018/047222
PCT Pub. Date: Mar. 15, 2018

(65) Prior Publication Data
US 2019/0193725 A1    Jun. 27, 2019

(51) Int. Cl.
G05D 1/02        (2020.01)
B62D 15/02       (2006.01)
B62D 5/04        (2006.01)
G06F 17/00       (2019.01)
B60W 30/06       (2006.01)
G05D 1/00        (2006.01)
G06V 20/56       (2022.01)

(52) U.S. Cl.
CPC ......... B60W 30/06 (2013.01); B62D 15/0285 (2013.01); G05D 1/0011 (2013.01); G05D 1/0038 (2013.01); G05D 1/0088 (2013.01); G06V 20/56 (2022.01); *B60W 2554/80* (2020.02); *G05D 2201/0213* (2013.01)

(58) Field of Classification Search
CPC .............. B60W 30/06; B60W 2554/80; B62D 15/0285; G05D 1/0038; G05D 1/0088; G05D 2201/0213; G06K 9/00791
See application file for complete search history.

(56) References Cited

U.S. PATENT DOCUMENTS

2008/0009990 A1*  1/2008  Katoh ................ B62D 15/0285
                                                340/436
2010/0060486 A1   3/2010  Nakashima et al.
(Continued)

FOREIGN PATENT DOCUMENTS

GB    2493446 A        2/2013
GB    2493446 A   *    2/2013    ............. G08G 1/165
(Continued)

*Primary Examiner* — Adam D Tissot
(74) *Attorney, Agent, or Firm* — Young Basile Hanlon & MacFarlane, P.C.

(57) ABSTRACT

An exit assist method is executed using an exit assist controller configured to control a subject vehicle to move from an exit start position to a target exit position along an exit route. The exit assist method includes determining whether or not an adjacent parked vehicle is present in an adjacent parking space to the exit start position, and when no adjacent parked vehicle is present, generating the exit route that includes the adjacent parking space.

8 Claims, 25 Drawing Sheets

(56) References Cited

U.S. PATENT DOCUMENTS

| | | | |
|---|---|---|---|
| 2012/0072067 A1* | 3/2012 | Jecker | B62D 15/0285 |
| | | | 701/25 |
| 2016/0075331 A1 | 3/2016 | Tomozawa et al. | |
| 2016/0101813 A1 | 4/2016 | Ishijima et al. | |
| 2016/0159397 A1* | 6/2016 | Baek | B60W 30/06 |
| | | | 701/41 |
| 2017/0259850 A1* | 9/2017 | Yamashita | B62D 15/028 |

FOREIGN PATENT DOCUMENTS

| | | |
|---|---|---|
| JP | 2008033438 A | 2/2008 |
| JP | 2008213791 A | 9/2008 |
| JP | 2010064546 A | 3/2010 |
| JP | 2010132029 A | 6/2010 |
| JP | 2012056428 A | 3/2012 |
| JP | 2013123922 A | 6/2013 |
| JP | 2013163490 A | 8/2013 |
| JP | 2013177128 A * | 9/2013 |
| JP | 2013177128 A | 9/2013 |
| JP | 2015-174586 A | 10/2015 |
| JP | 2016060222 A | 4/2016 |
| WO | 2014/196040 A1 | 12/2014 |

* cited by examiner

FIG. 11
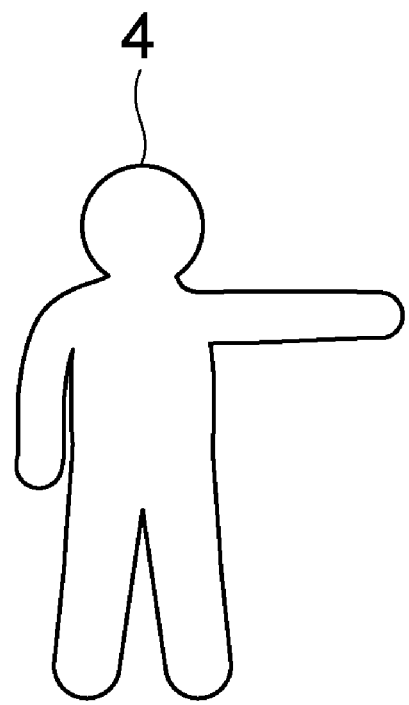
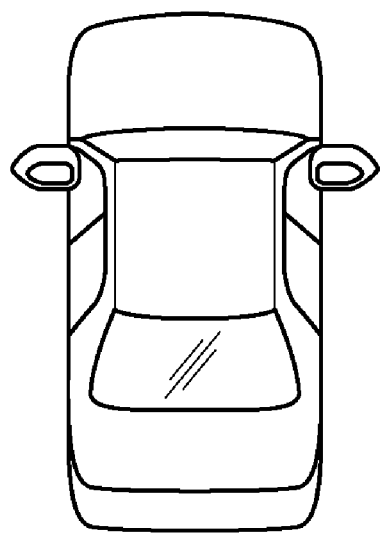

FIG. 20
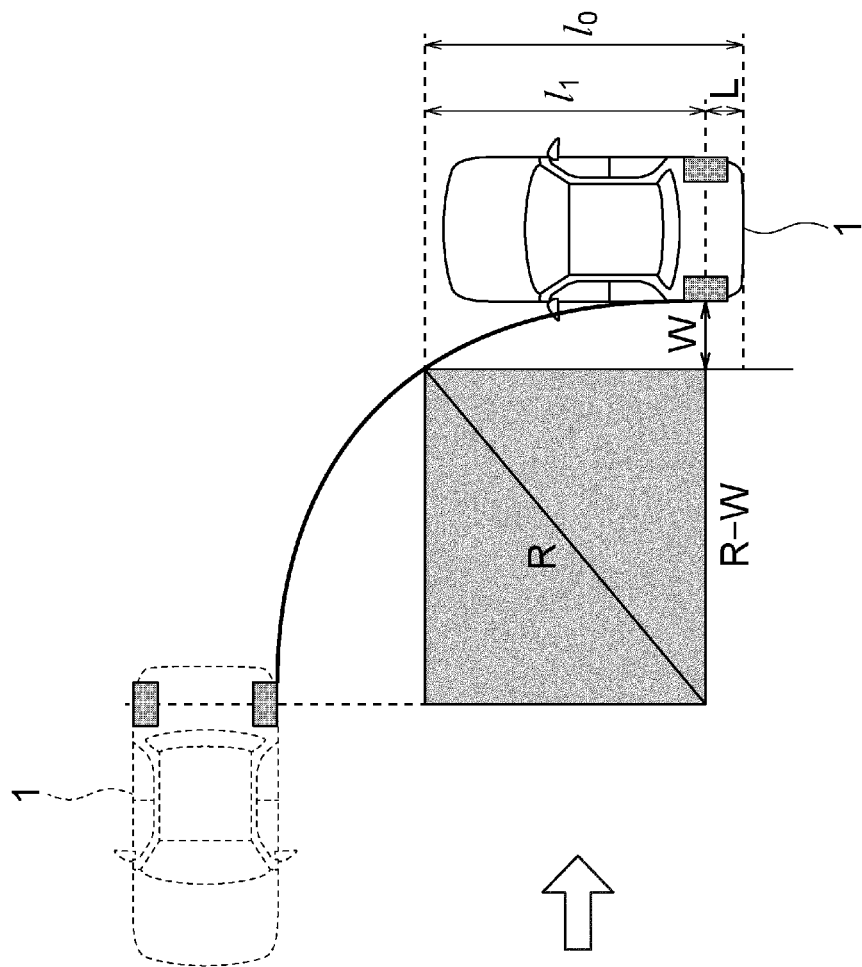
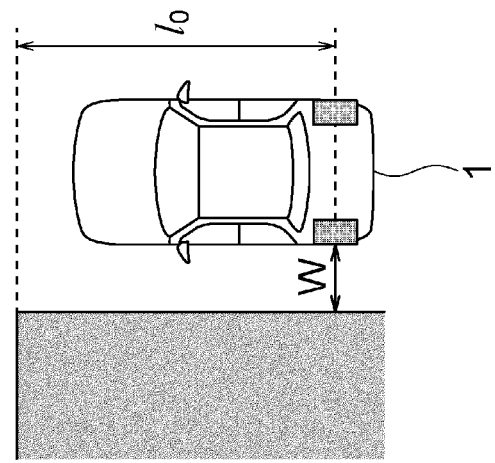

DISPATCH SUPPORT METHOD AND DEVICE

TECHNICAL FIELD

The present invention relates to an exit assist method and an exit assist apparatus.

BACKGROUND

A system for controlling a vehicle to automatically exit a parking location is known. This system sets an exit position and generates a trajectory from the parking location to the exit position and, when an obstacle as a stationary object is detected, sets a regenerated trajectory that allows the vehicle to avoid the obstacle and reach the exit position (see Japanese Patent Application JP2013-177128A, for example).

In the system described in Japanese Patent Application JP2013-177128A, an exit route is not generated in accordance with the presence or absence of a parked vehicle adjacent to the subject vehicle, and options for the exit route is narrow.

SUMMARY

A problem to be solved by the present invention is to provide an exit assist method and an exit assist apparatus with which options for an exit route can be widened.

The present invention solves the above problem through determining whether or not an adjacent parked vehicle is present in an adjacent parking space to an exit start position; when the adjacent parked vehicle is present, generating an exit route that does not include the adjacent parking space; and when no adjacent parked vehicle is present, generating an exit route that includes the adjacent parking space.

According to the present invention, options for the exit route can be widened.

BRIEF DESCRIPTION OF THE DRAWINGS

FIG. 11 is a diagram for describing a method of manually setting an exit position of the subject vehicle controlled to exit by remote control;

FIG. 20 is a diagram for describing a process of generating an exit route of the subject vehicle exiting forward;

DETAILED DESCRIPTION

Figure 1:
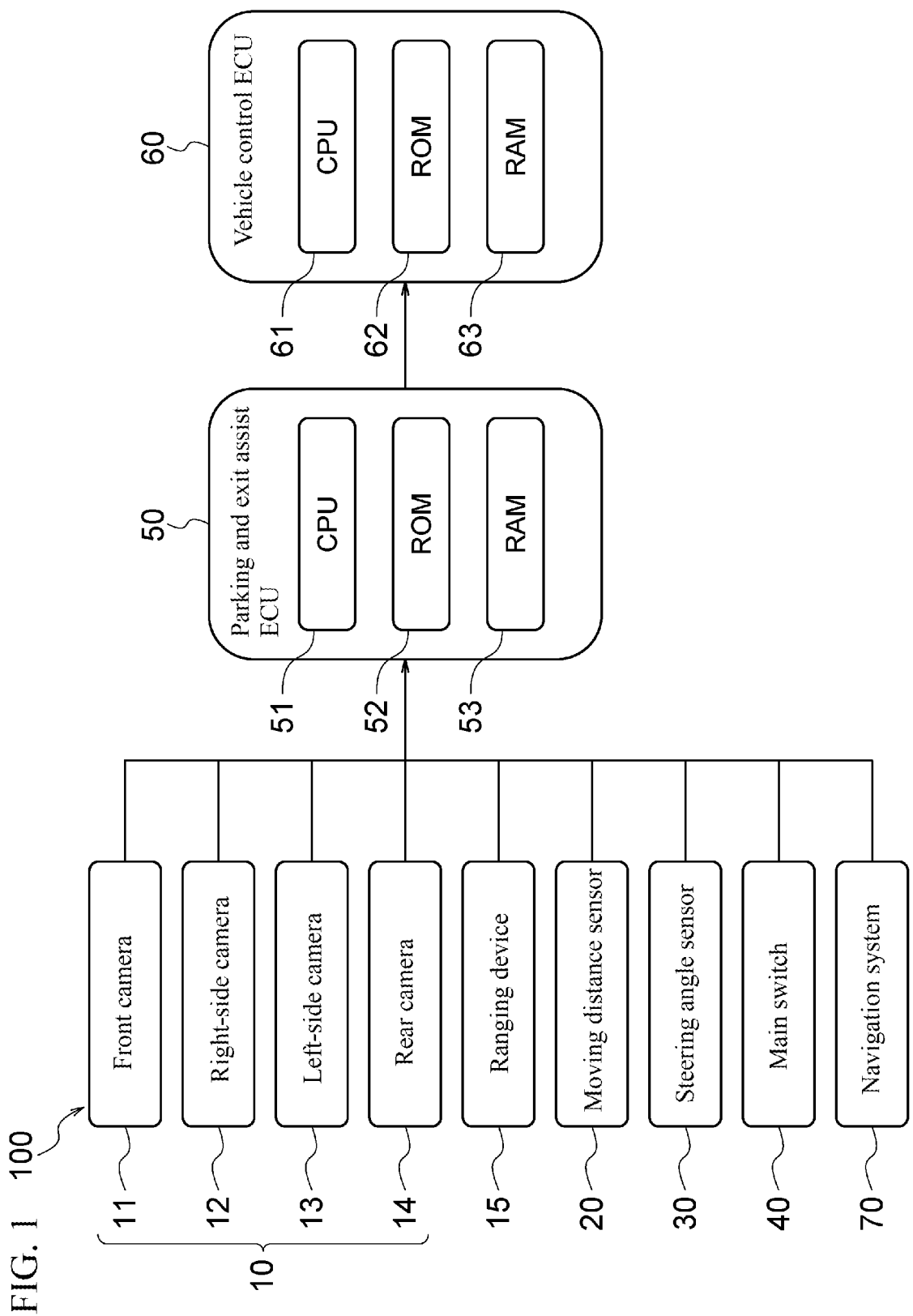
FIG. 1 is a block diagram illustrating the configuration of a parking and exit assist apparatus according to one or more embodiments of the present invention.

Hereinafter, one or more embodiments of the present invention will be described with reference to the drawings. FIG. 1 is a block diagram illustrating the configuration of a parking and exit assist apparatus 100 according to one or more embodiments of the present invention. The parking and exit assist apparatus 100 is equipped in a vehicle and assists a parking operation of moving (parking) the vehicle into a parking space and an exit operation of moving the vehicle from the parking space. The parking and exit assist apparatus 100 may achieve the parking operation or exit operation of the vehicle by remote control. For example, the driver or passenger of the vehicle may input a command to start the parking or exit assist to a remote control device, such as a remote controller or a mobile terminal, outside the vehicle thereby to achieve the parking or exit operation of the vehicle.

The parking and exit assist apparatus 100 according to one or more embodiments of the present invention comprises a set of cameras 10, a ranging device 15, a moving distance sensor 20, a steering angle sensor 30, a main switch 40, a parking and exit assist electronic control unit (ECU) 50, a vehicle control ECU 60, and a navigation system 70. The parking and exit assist apparatus 100 further comprises hardware modules (not illustrated), such as an engine control ECU and a power assist ECU for steering, which are ordinarily equipped in a vehicle. These components are connected to one another via a controller area network (CAN) or other in-vehicle LAN to mutually exchange information.

The set of cameras 10 comprises a front camera 11, a right-side camera 12, a left-side camera 13, and a rear camera 14, for example, as illustrated in the figure. The front camera 11, which is installed at the front bumper of the vehicle or in the vicinity thereof, captures images ahead of the subject vehicle and outputs the image information to the parking and exit assist ECU 50. The right-side camera 12, which is installed on the right side of the vehicle (e.g. at the right-side part of the front of the vehicle), captures images on the right side of the subject vehicle and outputs the image information to the parking and exit assist ECU 50. The left-side camera 13, which is installed on the left side of the vehicle (e.g. at the left-side part of the front of the vehicle), captures images on the left side of the subject vehicle and outputs the image information to the parking and exit assist ECU 50. The rear camera 14, which is installed at the rear bumper of the vehicle or in the vicinity thereof, captures images behind the subject vehicle and outputs the image information to the parking and exit assist ECU 50.

The ranging device 15 is a radar device or a sonar, such as a millimeter-wave radar, laser radar, or ultrasonic radar. The ranging device 15 is installed at the same position as any of the cameras 11 to 14 and detects the presence or absence of objects such as obstacles, pedestrians, and other vehicles around the vehicle, the positions of the objects, and the distances to the objects.

The moving distance sensor 20 calculates the moving amount of the subject vehicle and outputs it to the parking and exit assist ECU 50. The moving distance sensor 20 can be configured, for example, using a rotation speed sensor or the like that detects the rotation speed of a wheel of the subject vehicle.

The steering angle sensor 30, which is installed inside the steering column, for example, detects the rotation angle of the steering wheel and outputs it to the parking and exit assist ECU 50.

The main switch 40 is a switch that is operated by the user to instruct the start of parking assist and exit assist. When the main switch 40 is not operated, it outputs an OFF signal to the parking and exit assist ECU 50, and when the main switch 40 is operated, it outputs an ON signal to the parking and exit assist ECU 50. The main switch 40 is installed, for example, at a location on a remote control device, such as a remote controller or a mobile terminal, which is carried by the driver or passenger who performs remote control outside the vehicle, a location at which the driver can operate the main switch 40 in the vehicle, such as a location around the instrument panel of the subject vehicle or around the steering wheel, or other appropriate location. The main switch 40 may be a software switch provided on the screen of a mobile terminal such as a smartphone capable of communicating with the vehicle via a network, a software switch provided on the screen of a navigation device, or other appropriate switch.

The parking and exit assist ECU 50 is a controller that comprehensively controls the parking and exit assist apparatus 100. The parking and exit assist ECU 50 comprises a ROM 52 that stores a parking and exit assist program, a CPU 51 as an operation circuit that executes the program stored in the ROM 52 to serve as the parking and exit assist apparatus 100 according to one or more embodiments of the present invention, and a RAM 53 that serves as an accessible storage device. The parking and exit assist ECU 50, to which detection information or commands are input from the set of cameras 10, the ranging device 15, the moving distance sensor 20, the steering angle sensor 30, and the main switch 40, calculates a target steering angle and a target vehicle speed of the subject vehicle and outputs them to the vehicle control ECU 60.

The vehicle control ECU 60 is a controller that performs the drive control of the vehicle. The vehicle control ECU 60 comprises a ROM 62 that stores a vehicle drive control program, a CPU 61 as an operation circuit that executes the program stored in the ROM 62 to serve as a vehicle control device, and a RAM 63 that serves as an accessible storage device. The vehicle control ECU 60, to which the target steering angle and target vehicle speed of the vehicle are input from the parking and exit assist ECU 50, performs the drive control of the vehicle in cooperation with other ECUs, such as the engine control ECU and the power assist ECU for steering.

Figure 2:
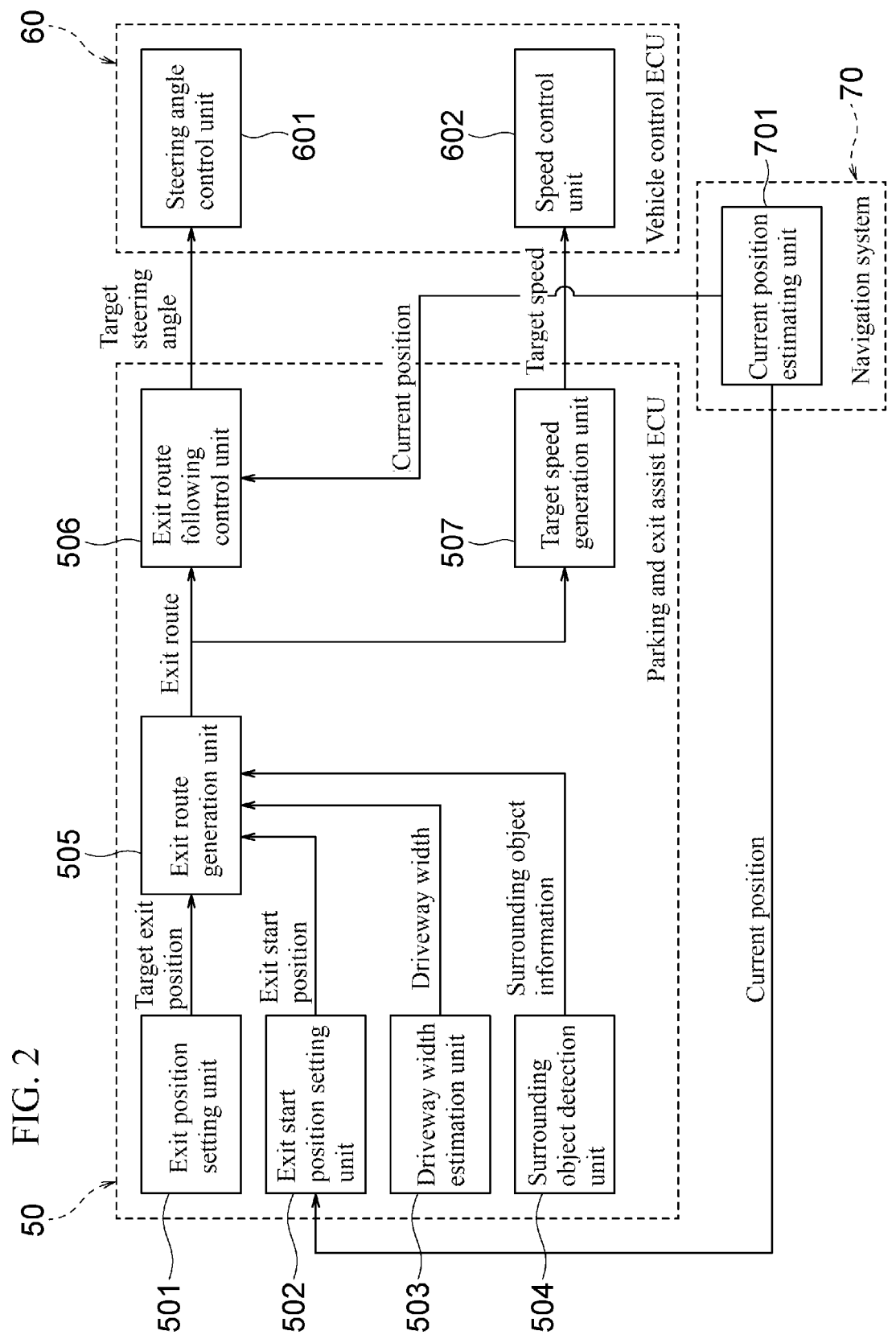
FIG. 2 is a block diagram for describing an exit assist function of the parking and exit assist ECU of FIG. 1.

FIG. 2 is a block diagram for describing an exit assist function of the parking and exit assist ECU 50. As illustrated in the figure, the parking and exit assist ECU 50 comprises an exit position setting unit 501, an exit start position setting unit 502, a driveway width estimation unit 503, a surrounding object detection unit 504, an exit route generation unit 505, an exit route following control unit 506, and a target speed generation unit 507. The vehicle control ECU 60 includes a steering angle control unit 601 and a speed control unit 602. The navigation system 70 includes a current position estimation unit 701. The current position estimating unit 701 estimates the current position of the subject vehicle and outputs it to the exit start position setting unit 502 and the exit route following control unit 506. Examples of the process of estimating the current position include a process of measuring the current position of the subject vehicle utilizing a global positioning system (GPS), a process of acquiring the current position via road-to-vehicle communication, a process of calculating the current position on the basis of the steering amount of the steering and the operation amount of the accelerator, and a process of accumulating the moving amount and position of the vehicle to calculate the current position.

The exit position setting unit 501 sets a position to which the subject vehicle is controlled to exit from the parking position by automated driving (this position will be referred to as a "target exit position," hereinafter). Here, depending on situations such as the presence or absence of a parked vehicle adjacent to the subject vehicle and the positional relationship between the parked vehicle and the subject vehicle, there are cases in which the exit direction of the subject vehicle is restricted or not restricted. In the case in which the exit direction of the subject vehicle is restricted by an adjacent parked vehicle, the exit position setting unit 501 sets the exit position in accordance with the positional relationship between the parked vehicle and the subject vehicle and/or whether the driveway for exit is right-side traffic or left-side traffic. On the other hand, in the case in which no adjacent parked vehicle is present or the exit direction of the subject vehicle is not restricted by an adjacent parked vehicle, the exit position setting unit 501 sets the exit position using various methods, which will be described later.

Here, the exit position which the exit position setting unit 501 sets when the exit direction of the subject vehicle is restricted by an adjacent parked vehicle may be an exit position that cannot be changed through selection by the driver or passenger, that is, an exit position that is restricted, or an exit position that can be changed through selection by the driver or passenger, that is, an exit position that is set initially or recommended.

Figure 3:
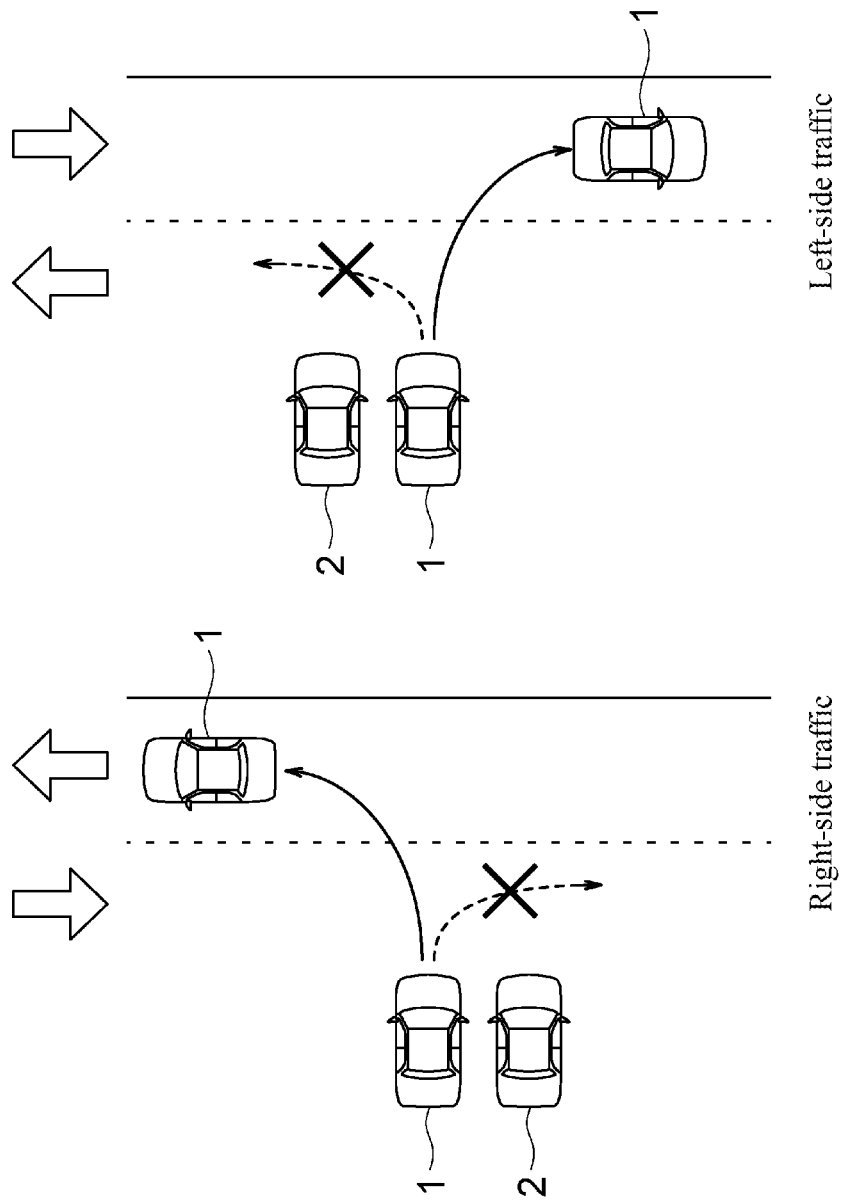
FIG. 3 is a set of a table and diagrams for describing a method of setting an exit position of the subject vehicle exiting forward.
Figure 4:
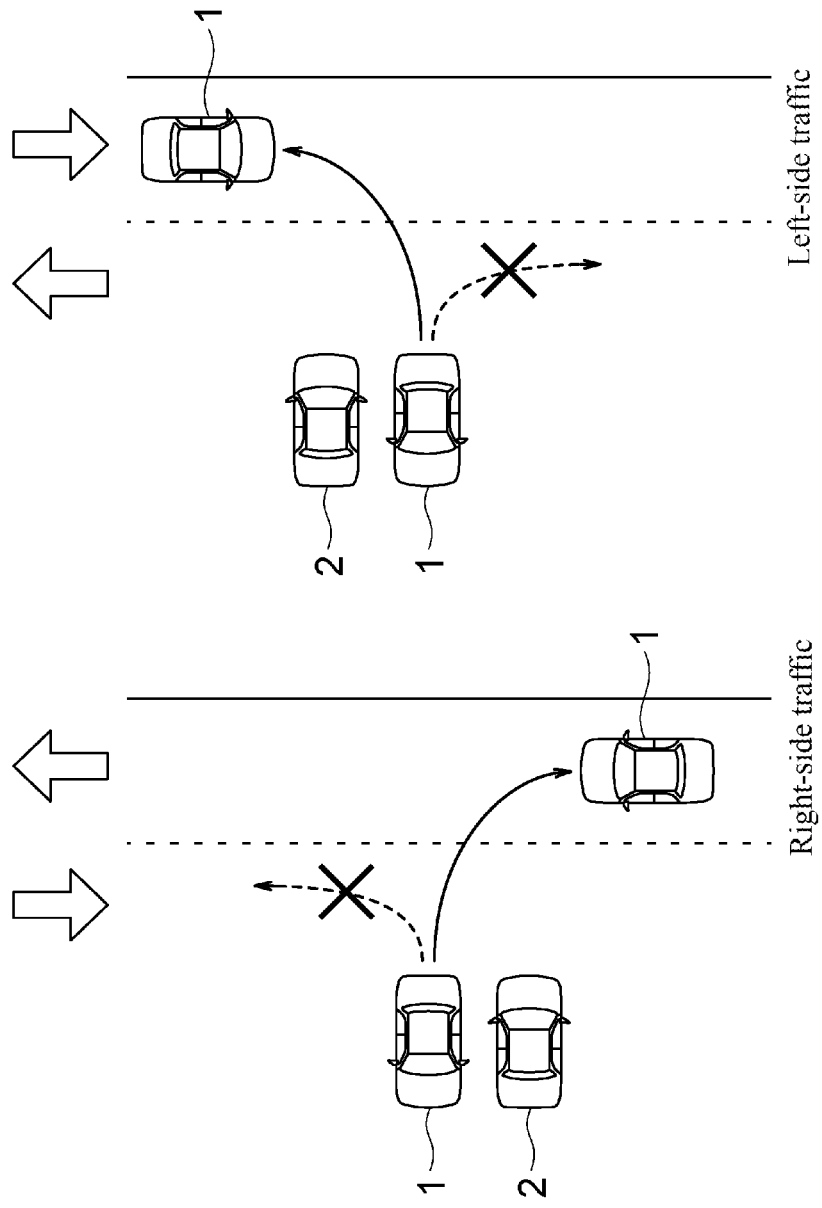
FIG. 4 is a set of a table and diagrams for describing a method of setting an exit position of the subject vehicle exiting backward.

FIGS. 3 and 4 are diagrams and tables for describing methods of setting the exit position of the subject vehicle 1. FIG. 3 illustrates a table and diagrams for describing a method of setting the exit position in a case in which a subject vehicle 1 exits forward. FIG. 4 illustrates a table and diagrams for describing a method of setting the exit position in a case in which the subject vehicle 1 exits backward.

As illustrated in the left-side diagram of FIG. 3, when an adjacent parked vehicle 2 is present on the right side of the subject vehicle 1 which exits forward and the driveway for exit is right-side traffic, it is easier for the subject vehicle 1 to exit to the left side than to the right side as viewed from the subject vehicle 1; therefore, the exit position is set in the right-side lane on the left side as viewed from the subject vehicle 1. In contrast, when an adjacent parked vehicle 2 is present on the right side of the subject vehicle 1 which exits forward and the driveway for exit is left-side traffic, there is no significant difference in easiness between when the subject vehicle 1 exits to the left side as viewed from the subject vehicle 1 and when the subject vehicle 1 exits to the right side as viewed from the subject vehicle 1; therefore, the exit position of the subject vehicle 1 is not restricted. Easiness of exit of the subject vehicle 1 is determined on the basis of whether the distance of a linear movement segment to be described later is long or short, whether the turning radius is large or small, and/or whether the number of turns for exit is large or small.

On the other hand, as illustrated in the right-side diagram of FIG. 3, when an adjacent parked vehicle 2 is present on the left side of the subject vehicle 1 which exits forward and the driveway for exit is left-side traffic, it is easier for the subject vehicle 1 to exit to the right side than to the left side as viewed from the subject vehicle 1; therefore, the exit position is set in the left-side lane on the right side as viewed from the subject vehicle 1. In contrast, when an adjacent parked vehicle 2 is present on the left side of the subject vehicle 1 which exits forward and the driveway for exit is right-side traffic, there is no significant difference in easiness between when the subject vehicle 1 exits to the left side as viewed from the subject vehicle 1 and when the subject vehicle 1 exits to the right side as viewed from the subject vehicle 1; therefore, the exit position of the subject vehicle 1 is not restricted.

As illustrated in the left-side diagram of FIG. 4, when an adjacent parked vehicle 2 is present on the right side of the subject vehicle 1 which exits backward (i.e. on the left side as viewed from the driver) and the driveway for exit is right-side traffic, it is easier for the subject vehicle 1 to exit to the right side as viewed from the subject vehicle 1 (i.e. the rear left side as viewed from the driver) than to the left side as viewed from the subject vehicle 1 (i.e. the rear right side as viewed from the driver); therefore, the exit position is set in the right-side lane on the right side as viewed from the subject vehicle 1 (i.e. the rear left side as viewed from the driver). In contrast, when an adjacent parked vehicle 2 is present on the right side of the subject vehicle 1 which exits backward and the driveway for exit is left-side traffic, there is no significant difference in easiness between when the subject vehicle 1 exits to the left side as viewed from the subject vehicle 1 and when the subject vehicle 1 exits to the right side as viewed from the subject vehicle 1; therefore, the exit position of the subject vehicle 1 is not restricted. When exiting backward, turning is performed with reference to the front wheel axle. As illustrated by the solid arrow in the left-side diagram of FIG. 4, when exiting to the right side as viewed from the subject vehicle, the clearance between the left front wheel and the adjacent parked vehicle 2 when turning is large. In contrast, as illustrated by the dashed arrow in the left-side diagram of FIG. 4, when exiting to the left side as viewed from the subject vehicle, the clearance between the left front wheel and the adjacent parked vehicle 2 when turning is relatively small. In the situation illustrated in the left-side diagram of FIG. 4, therefore, it is easier for the subject vehicle 1 to exit to the right side than to the left side as viewed from the subject vehicle 1.

On the other hand, when an adjacent parked vehicle 2 is present on the left side of the subject vehicle 1 which exits forward (i.e. on the right side as viewed from the driver) and the driveway for exit is left-side traffic, it is easier for the subject vehicle 1 to exit to the left side as viewed from the subject vehicle 1 (i.e. the rear right side as viewed from the driver) than to the right side as viewed from the subject vehicle 1 (i.e. the rear left side as viewed from the driver); therefore, the exit position is set in the left-side lane on the left side as viewed from the subject vehicle 1 (i.e. the rear right side as viewed from the driver). In contrast, when an adjacent parked vehicle 2 is present on the left side of the subject vehicle 1 which exits backward and the driveway for exit is right-side traffic, there is no significant difference in easiness between when the subject vehicle 1 exits to the left side as viewed from the subject vehicle 1 and when the subject vehicle 1 exits to the right side as viewed from the subject vehicle 1; therefore, the exit position of the subject vehicle 1 is not restricted.

Here, when the exit position of the subject vehicle 1 is not restricted due to the presence of an adjacent parked vehicle 2, the exit position of the subject vehicle 1 is automatically or manually set. FIGS. 5 to 16 are diagrams for describing methods of automatically or manually setting the exit direction of the subject vehicle 1.

Figure 5:
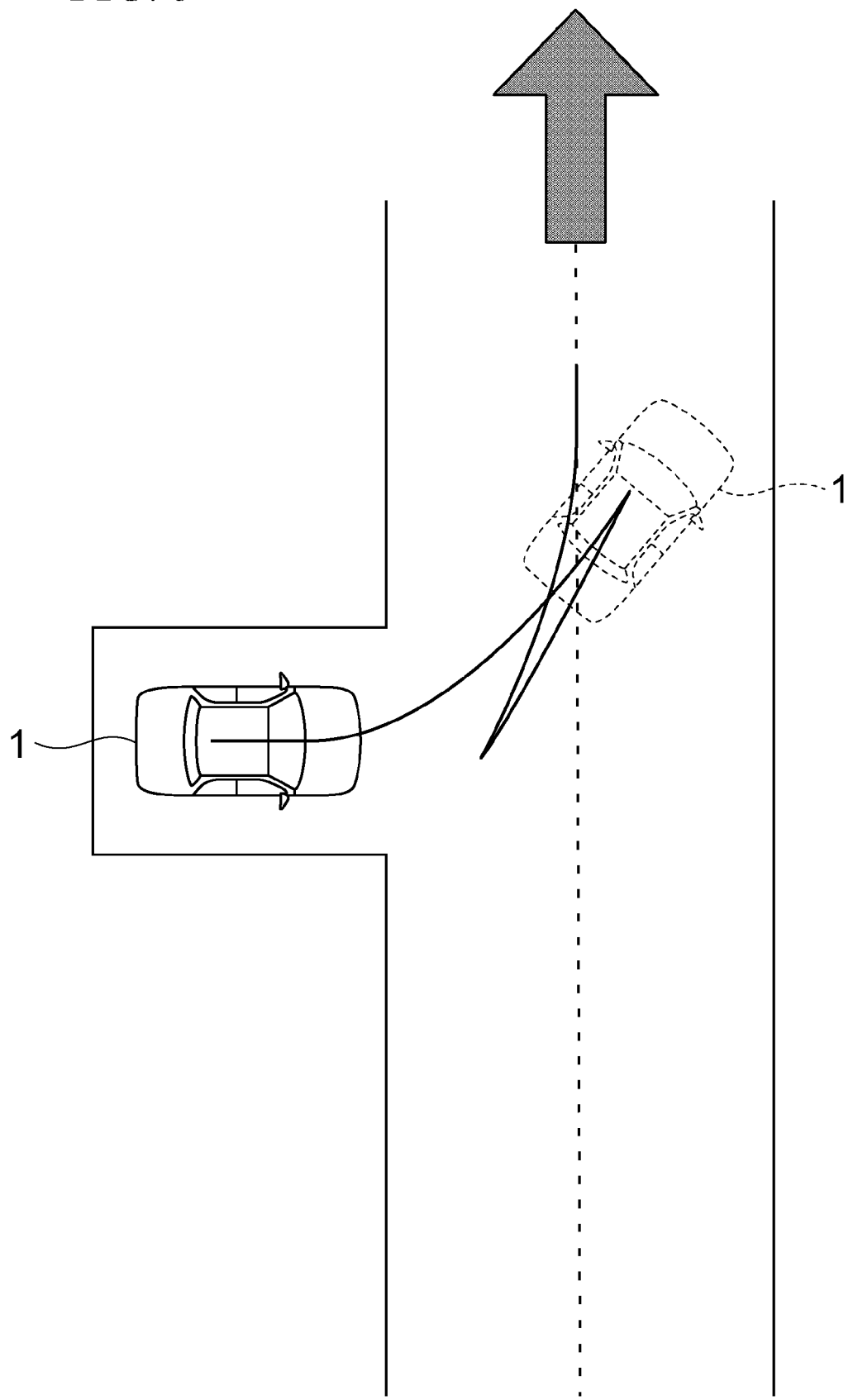
FIG. 5 is a diagram for describing a method of automatically setting an exit direction of the subject vehicle.

First, as illustrated in FIG. 5, the method of automatically setting the exit position of the subject vehicle 1 may include a method of setting the exit direction to the traffic direction of the driveway for exit. Here, the following methods (1) to (4) can be exemplified as a method of determining the traffic direction of the driveway for exit:

(1) a method of detecting a traffic sign and/or a mark on the road surface indicating the traveling direction from the image information obtained by the cameras 11 to 14 and determining the traffic direction of the driveway for exit as the direction indicated by the detected traffic mark and/or the mark on a road;

(2) a method of detecting the traveling direction of another vehicle from the image information obtained by the cameras 11 to 14 or the ranging information obtained by the ranging device 15 and determining the traffic direction of the driveway for exit as the detected traveling direction of another vehicle;

(3) a method of recording a travel history including traveling directions until the subject vehicle enters the parking position and determining the traffic direction of the driveway for exit as a traveling direction included in the travel history; and (4) a method of receiving the traffic direction from a base station of the parking lot and determining the traffic direction of the driveway for exit as the received traffic direction.

As an example, the method of automatically setting the exit position of the subject vehicle 1 may be a method of setting the exit position on the basis of a past exit history of the subject vehicle 1. In this setting method, the exit direction is set to the right when a determination value J represented by the following equation (1) is a positive value while the exit direction is set to the left when the determination value J is a negative value:

[Equation 1]

$$J = \sum \left( \frac{1}{T_i} \times D_i \right) \quad (1)$$

where $T_i$ is an elapsed time and $D_i$ represents the exit direction; $D_i=+1$ for the right direction and $D_i=-1$ for the left direction.

Table 1 lists an example of the exit history. For the parking lot A listed in the table, $J=(((1/1)\times(+1))+((\frac{1}{2})\times(+1))+((\frac{1}{2})\times(+1)))=+2$ is obtained, which represents the right direction. Likewise, for the parking lot B, $J=(((\frac{1}{2})\times(-1))+((\frac{1}{2})\times(-1))+((\frac{1}{4})\times(-1)))=-1.25$ is obtained, which represents the left direction. For the parking lot C, $J=(((\frac{1}{2})\times(+1))+((1/1)\times(+1))+((1/1)\times(-1)))=+0.5$ is obtained, which represents the right direction. Thus, inclusion of the elapsed time in the above equation (1) allows a determination to be made such that the latest exit history is prioritized. In other words, even in a case in which the subject vehicle exited preferentially in the left direction in past times, when the subject vehicle exited preferentially in the right direction in the latest history, the subject vehicle is to exit in the right direction. This allows the subject vehicle to exit in accordance with the current environment for exit. The elapsed time listed in the following Table 1 is in terms of hours such as one hour, but the present invention is not limited to this, and seconds, minutes, and days may also be employed.

501 sets the exit direction to the right direction. On the other hand, in step S5, the exit position setting unit 501 sets the exit direction to the left direction. The process is thus completed.

Figure 8:
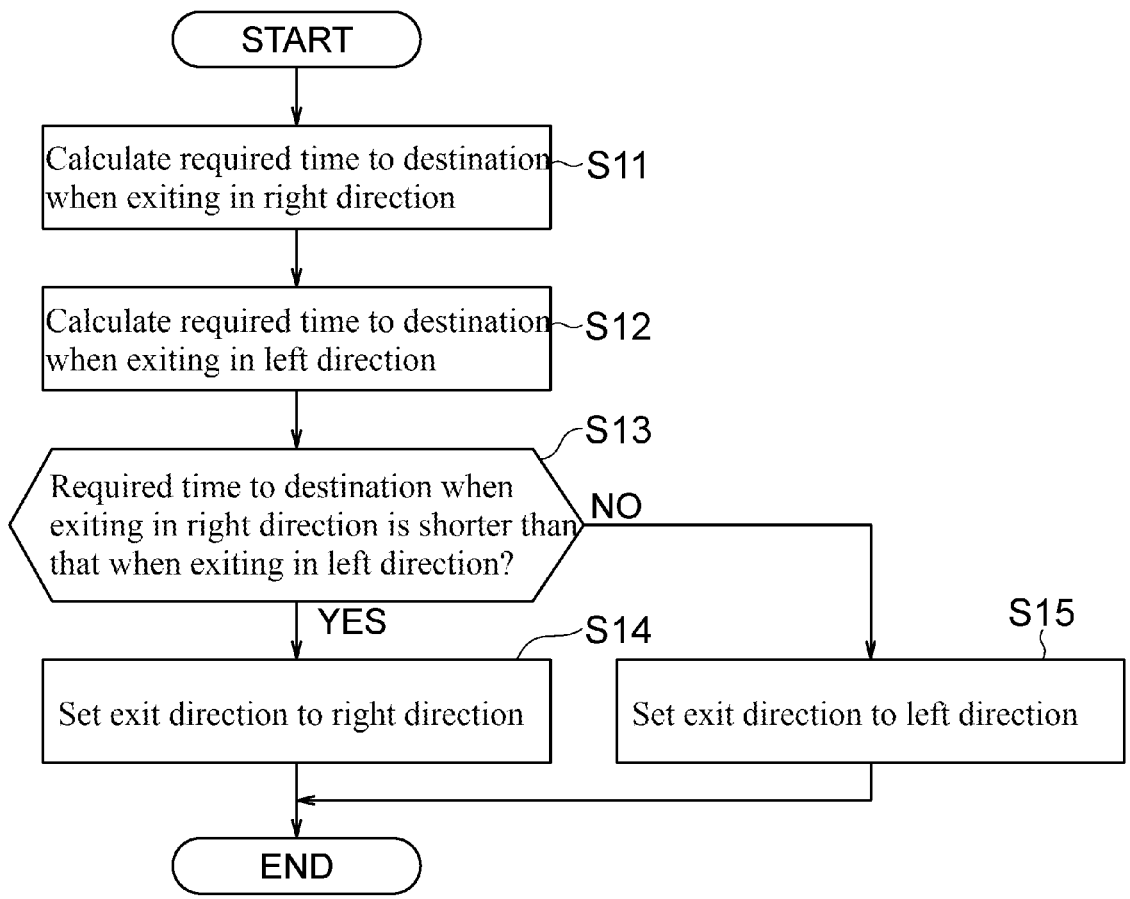
FIG. 8 is a flowchart illustrating the procedure of setting an exit position of the subject vehicle in accordance with the required time to a destination.

FIG. 8 is a flowchart illustrating a procedure of setting the exit position of the subject vehicle 1 in accordance with the required time to a destination. As illustrated in the flowchart of the figure, in step S11, the exit position setting unit 501 first calculates the required time to a destination when exiting in the right direction. Then, in step S12, the exit position setting unit 501 calculates the required time to the destination when exiting in the left direction. Then, in step S13, the exit position setting unit 501 determines whether or not the required time to the destination when exiting in the right direction is shorter than the required time to the destination when exiting in the left direction. An affirmative determination is followed by step S14 while a negative determination is followed by step S15. In step S14, the exit position setting unit 501 sets the exit direction to the right direction. On the other hand, in step S15, the exit position setting unit 501 sets the exit direction to the left direction. The process is thus completed.

Figure 9:
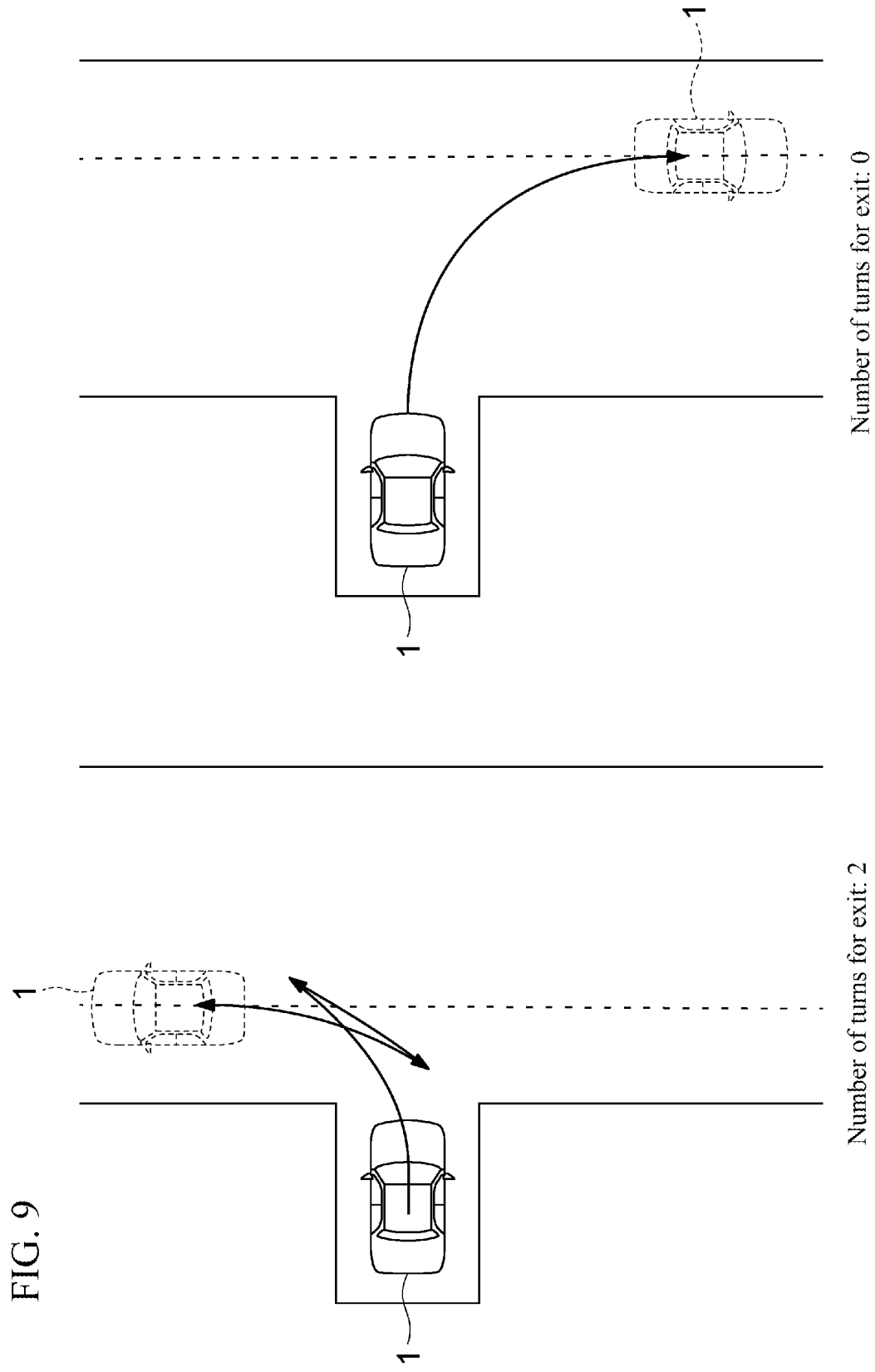
FIG. 9 is a set of views for describing a method of automatically setting an exit direction of the subject vehicle.

As an example, as illustrated in FIG. 9, the method of automatically setting the exit position of the subject vehicle 1 may include a method of setting the exit direction to a direction in which the number of turns for exit is small. As illustrated in the-left side diagram of FIG. 9, the number of turns for exit is two when exiting in the left direction, whereas as illustrated in the right-side diagram of FIG. 9, the number of turns for exit is zero when exiting in the right direction. In this case, the exit direction is set to the right direction.

TABLE 1

| | Exit direction history | | | | | |
|---|---|---|---|---|---|---|
| Parking lot | First time | | Second time | | Third time | |
| Parking lot A | Exit direction | Right | Exit direction | Right | Exit direction | Right |
| | Elapsed time | 1 hour | Elapsed time | 2 hours | Elapsed time | 2 hours |
| Parking lot B | Exit direction | Left | Exit direction | Left | Exit direction | Left |
| | Elapsed time | 2 hours | Elapsed time | 2 hours | Elapsed time | 4 hours |
| Parking lot C | Exit direction | Right | Exit direction | Right | Exit direction | Left |
| | Elapsed time | 2 hours | Elapsed time | 1 hour | Elapsed time | 1 hour |

Figure 6:
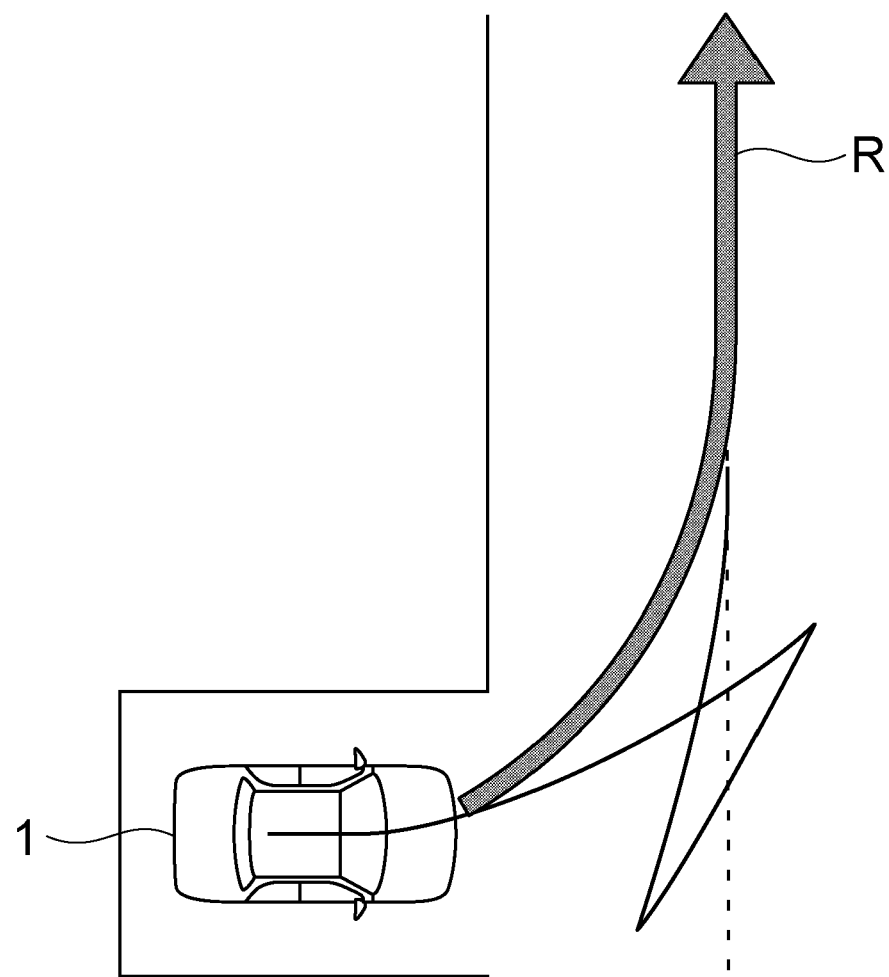
FIG. 6 is a diagram for describing a method of automatically setting an exit direction of the subject vehicle.

As an example, as illustrated in FIG. 6, the method of automatically setting the exit position of the subject vehicle 1 may include a method of setting the exit direction to the direction of a route R to a target point that is searched by the navigation system 70.

Figure 7:
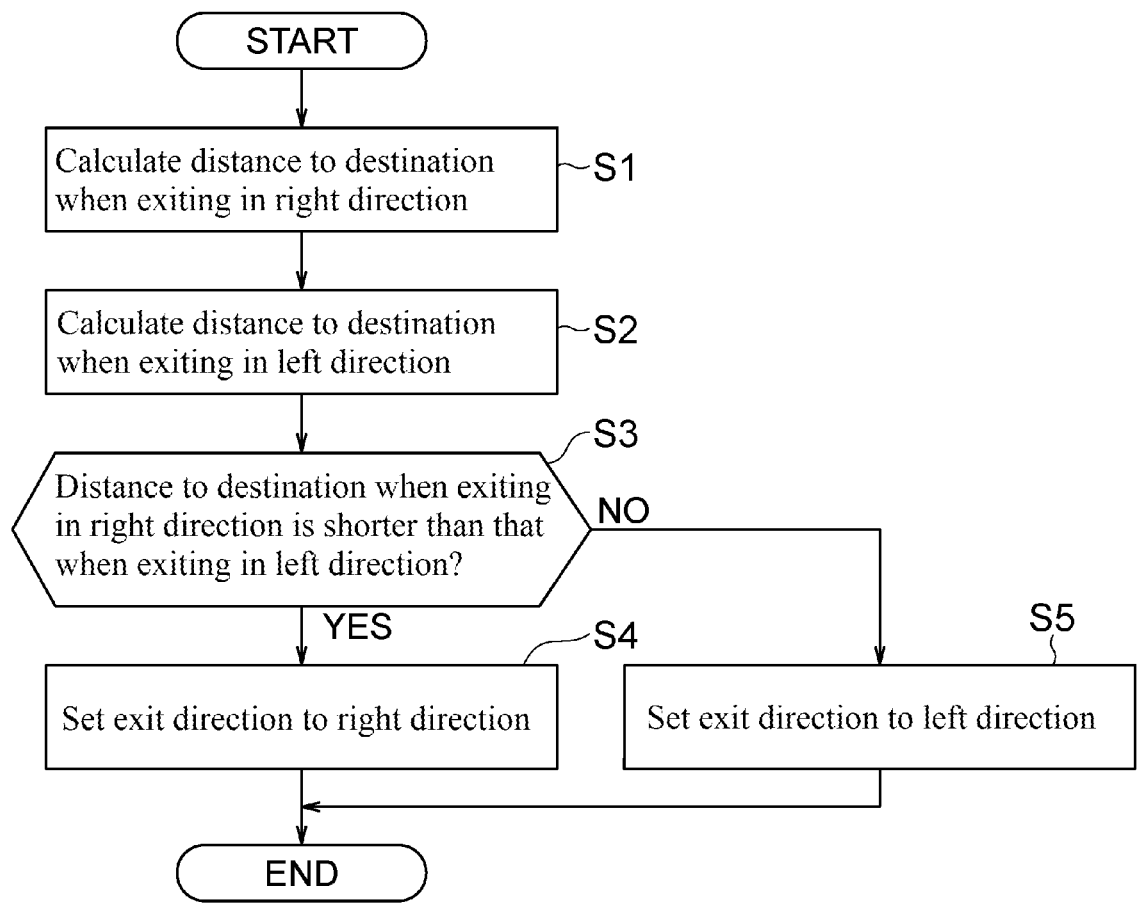
FIG. 7 is a flowchart illustrating the procedure of setting an exit position of the subject vehicle in accordance with the distance to a destination.
Figure 10:
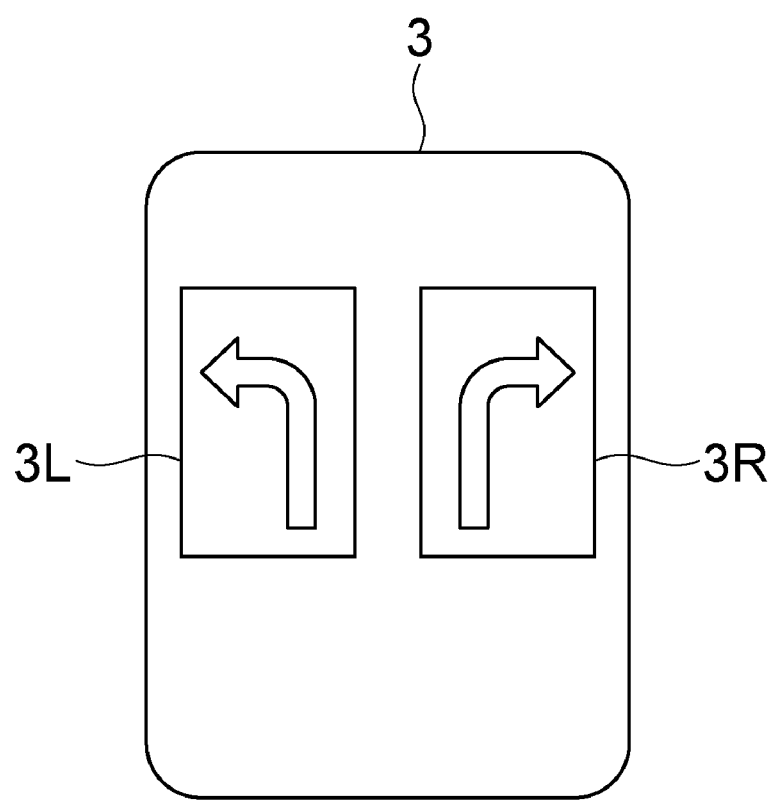
FIG. 10 is a diagram illustrating a remote controller operated by an operator.

FIGS. 7 and 8 are flowcharts illustrating procedures of automatically setting the exit position of the subject vehicle 1 according to one or more embodiments of the present invention. FIG. 7 is a flowchart illustrating a procedure of setting the exit position of the subject vehicle 1 in accordance with the distance to a destination. As illustrated in the flowchart of the figure, in step S1, the exit position setting unit 501 first calculates the distance to a destination when exiting in the right direction. Then, in step S2, the exit position setting unit 501 calculates the distance to the destination when exiting in the left direction. Then, in step S3, the exit position setting unit 501 determines whether or not the distance to the destination when exiting in the right direction is shorter than the distance to the destination when exiting in the left direction. An affirmative determination is followed by step S4 while a negative determination is followed by step S5. In step S4, the exit position setting unit Next, a method of setting the exit position of the subject vehicle 1 when the subject vehicle 1 is controlled to exit by remote control will be described. Examples of the method of manually setting the exit position of the subject vehicle 1, which is controlled to exit by remote control, include a method of setting the exit position in accordance with the operation of the touch panel display or operation key of the navigation system 70, a method of setting the exit position in accordance with the operation of the touch panel display or operation key of a mobile terminal such as a smartphone, a method of setting the exit position in accordance with the operation of the turn signal lever, a method of setting the exit position in accordance with the steering angle and/or steering torque detected when steering, and a method of setting the exit position in accordance with the operation of the button of a remote control key. As illustrated in FIG. 10, the remote control key 3 may be provided with a button 3L for instructing exit to the left direction and a button 3R for instructing exit to the right direction.

Examples of the method of manually setting the exit position of the subject vehicle 1, which is controlled to exit by remote control, further include a method of setting the exit position in accordance with the motion of an operator 4, as illustrated in FIG. 11. In this exemplified method, for example, when the operator 4 indicates the exit direction with the operator's arm, the motion of the operator 4 is detected using the cameras 11 to 14 and/or an onboard sensor such as the ranging device 15 of the subject vehicle 1, a sensor provided on the mobile terminal or remote controller carried by the operator 4, a sensor installed at the parking lot, or other appropriate sensor.

Figure 12:
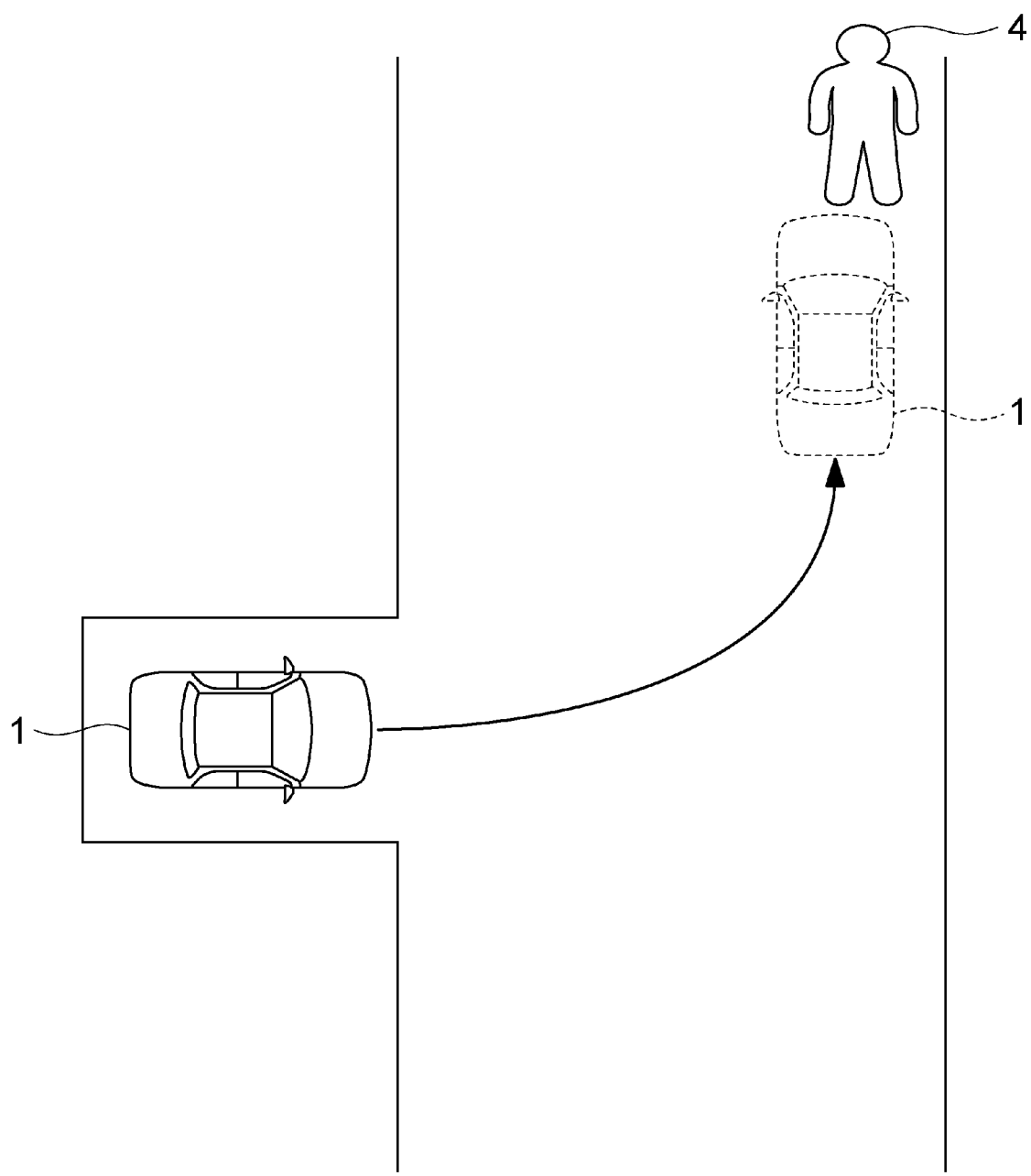
FIG. 12 is a diagram for describing a method of automatically setting an exit position of the subject vehicle controlled to exit by remote control.

Examples of the method of automatically setting the exit position of the subject vehicle 1, which is controlled to exit by remote control, include a method of setting the exit position in the vicinity of the operator 4, as illustrated in FIG. 12. In this method, examples of the method of detecting the position of the operator 4 include a method of detecting the position of the operator 4 using an appropriate sensor, such as the cameras 11 to 14, ranging device 15, or other onboard sensor of the subject vehicle 1, a sensor provided on the mobile terminal or remote controller carried by the operator 4, or a sensor installed at the parking lot. Examples of the method of selecting the exit direction include a method of comparing the distance between the exit position in the right direction and the operator 4 with the distance between the exit position in the left direction and the operator 4 and selecting the exit position in a direction in which the distance is shorter than the other.

Figure 13:
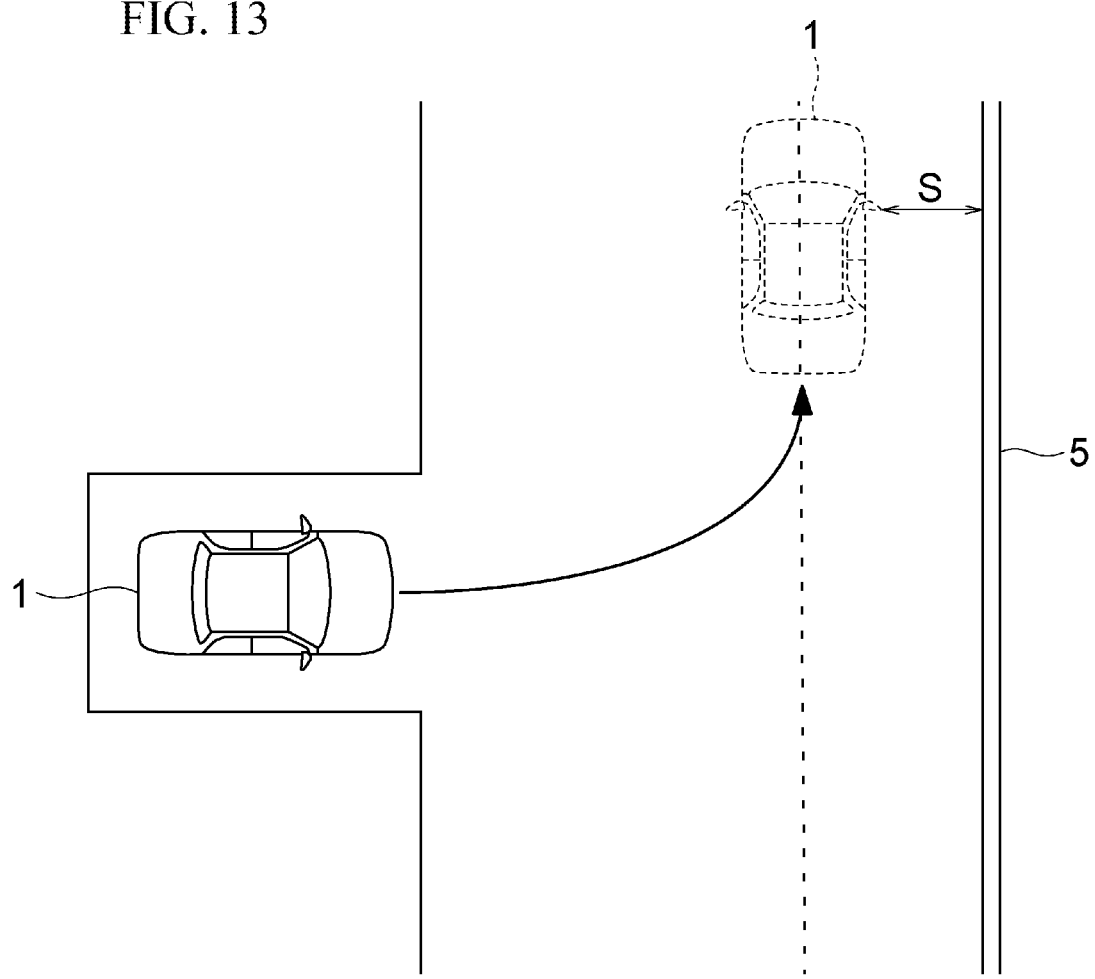
FIG. 13 is a diagram for describing a method of automatically setting an exit position of the subject vehicle controlled to exit by remote control.
Figure 14:
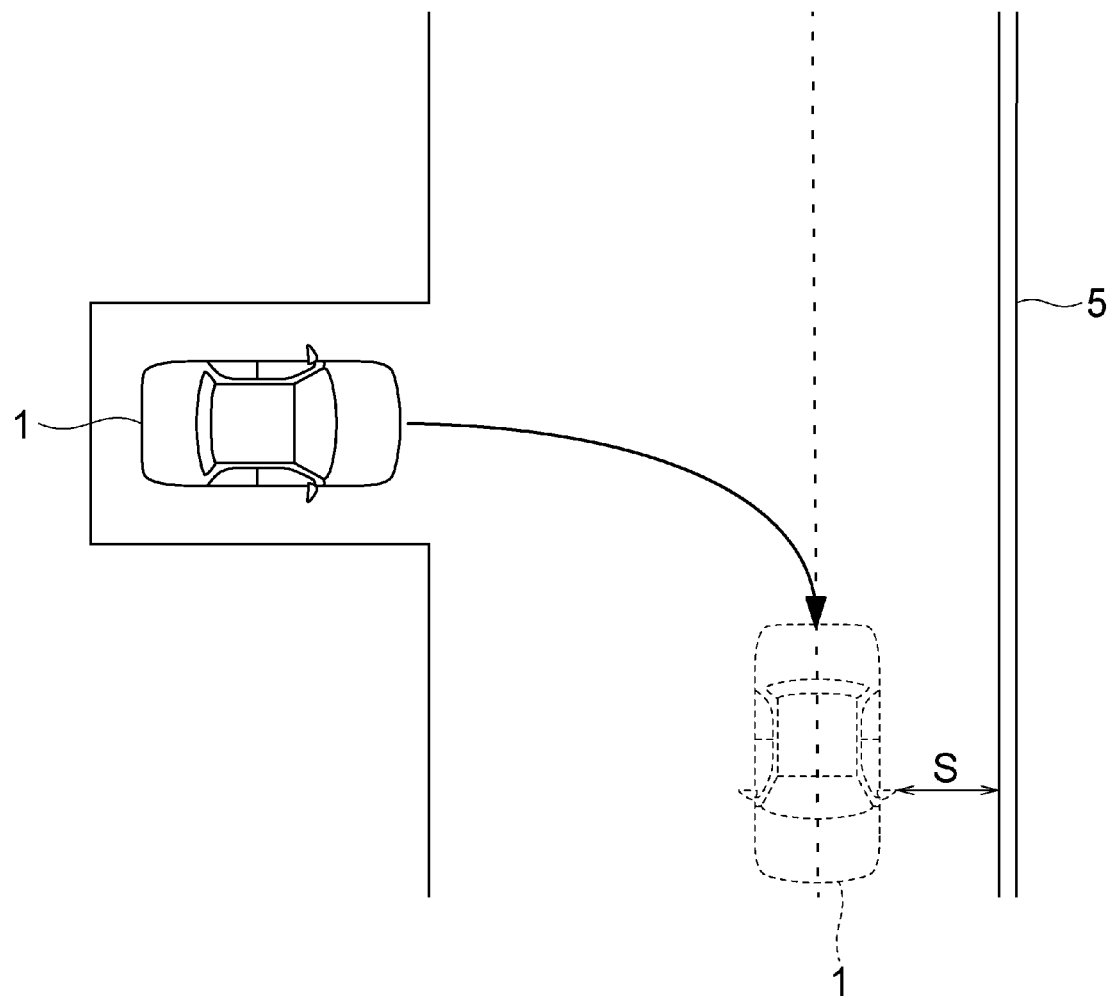
FIG. 14 is a diagram for describing a method of automatically setting an exit position of the subject vehicle controlled to exit by remote control.

Examples of the method of automatically setting the exit position of the subject vehicle 1, which is controlled to exit by remote control, further include a method of setting the exit position to a position at which the operator 4 can easily get onto the subject vehicle 1, as illustrated in FIGS. 13 and 14. Examples of the position at which the operator 4 can easily get onto the subject vehicle 1 include a position at which a space S can be ensured for the operator 4 to get onto the driver's seat between the door on the driver's seat side of the subject vehicle 1 and a wall 5, as illustrated in FIG. 13, and a position at which a space S can be ensured for the operator 4 to get onto the front passenger's seat between the door on the front passenger's seat side of the subject vehicle 1 and a wall 5, as illustrated in FIG. 14.

Figure 15:
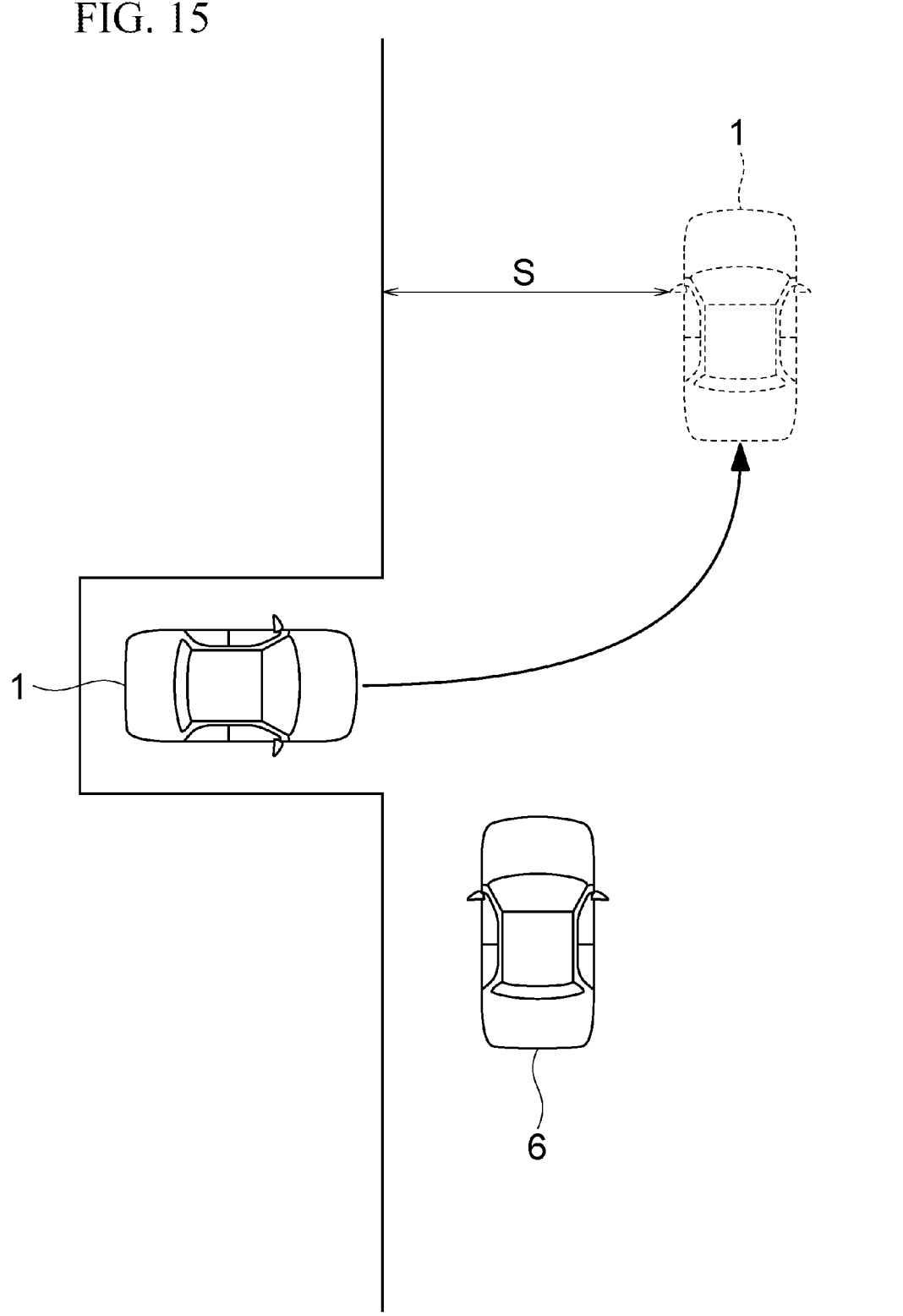
FIG. 15 is a diagram for describing a method of automatically setting an exit position of the subject vehicle controlled to exit by remote control.

Examples of the method of automatically setting the exit position of the subject vehicle 1, which is controlled to exit by remote control, further include a method of setting the exit position to a position at which a space S is ensured for another vehicle 6 to pass between the parking position and the exit position, as illustrated in FIG. 15.

Figure 16:
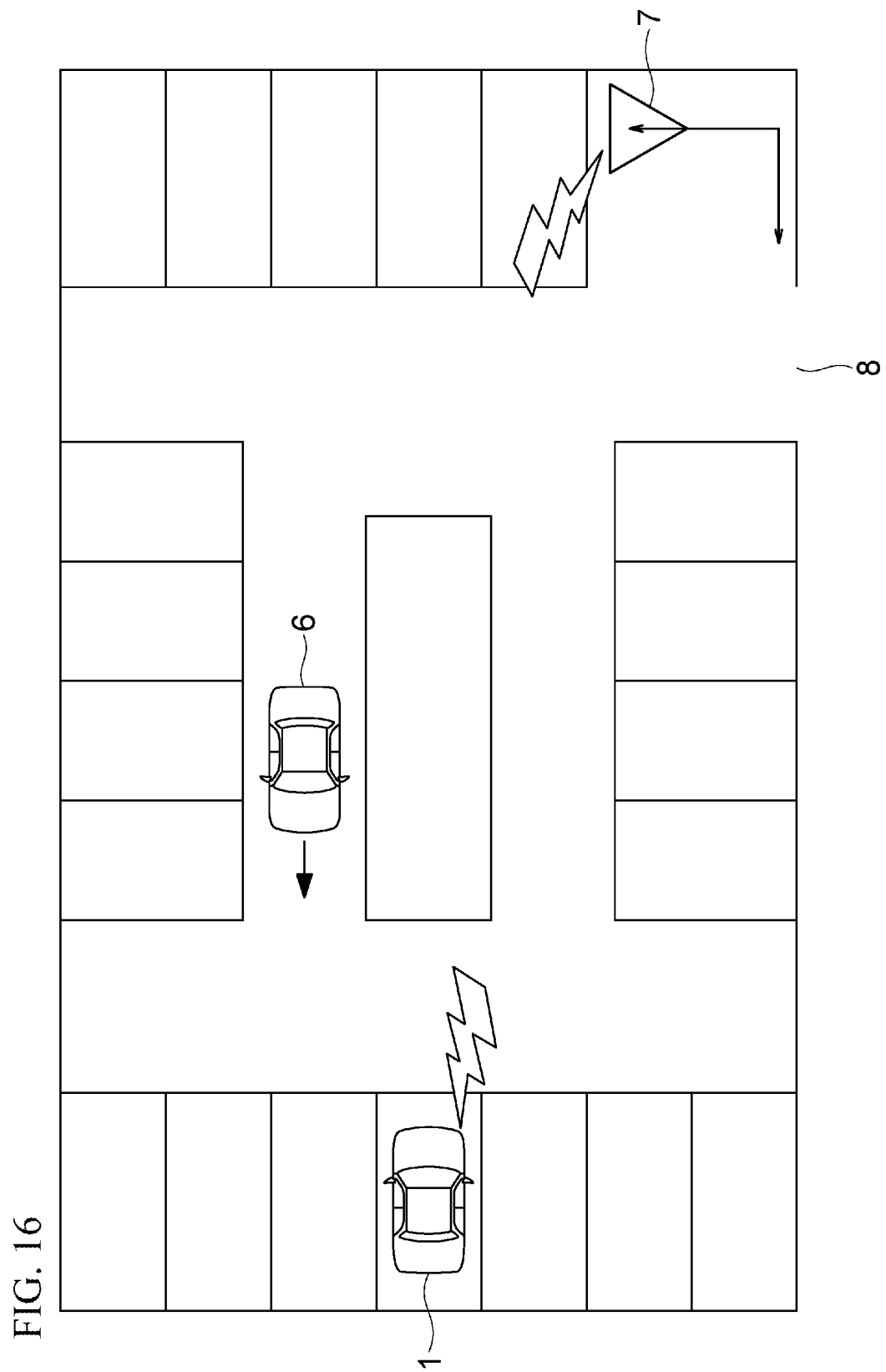
FIG. 16 is a diagram for describing a method of automatically setting an exit position of the subject vehicle controlled to exit by remote control in an unmanned parking lot.

Examples of the method of automatically setting the exit position of the subject vehicle 1, which is controlled to exit by remote control in an unmanned parking lot, as illustrated in FIG. 16, include a method of setting the exit position in accordance with a command from a base station 7 of the parking lot. Examples of the exit direction instructed from the base station 7 include a direction in which the distance to the exit 8 of the parking lot is short and a direction corresponding to the traveling direction of another vehicle 6.

Referring again to FIG. 2, the exit start position setting unit 502 sets a position at which the exit assist process is started (this position will be referred to as an "exit start position," hereinafter) and outputs it to the exit route generation unit 505. For example, when the main switch 40 is operated, the exit start position setting unit 502 acquires the current position of the subject vehicle 1 at that time from the current position estimation unit 701 and sets the acquired current position as the exit start position.

Figure 17:
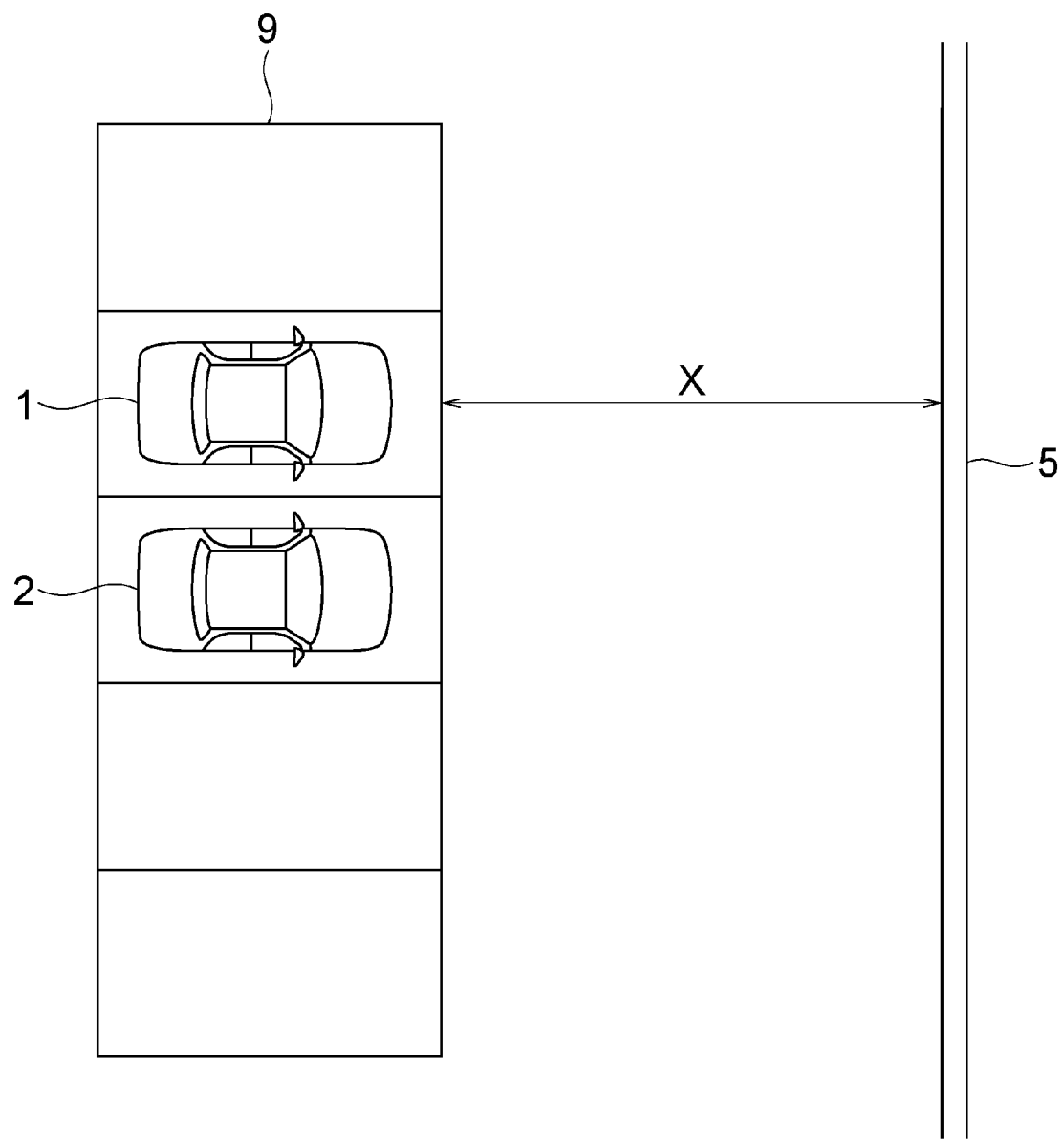
FIG. 17 is a diagram for describing a method of estimating a width X of the driveway for exit.

The driveway width estimation unit 503 estimates a width X of the driveway for exit (referred to as a "driveway width," hereinafter) and outputs it to the exit route generation unit 505. For example, as illustrated in FIG. 17, when the subject vehicle 1 exits to the driveway between parking spaces 9 and a wall 5, the driveway width X may be obtained through detecting positions of frames of the parking spaces 9 from the image information obtained by the cameras 11 to 14, detecting the distance from the subject vehicle 1 to the wall 5 from the ranging information obtained by the ranging device 15 and/or the image information obtained by the cameras 11 to 14, and estimating the driveway width X between frames of the parking spaces 9 and the wall 5. Instead of the positions of the parking spaces 9, the position of the parked vehicle 2 may be detected and the distance between the parked vehicle 2 and the wall 5 may be estimated as the driveway width X, or the distance between the subject vehicle 1 and the wall 5 may be estimated as the driveway width X. The driveway width X may be estimated and recorded on the basis of the ranging information obtained by the ranging device 15 and/or the image information obtained by the cameras 11 to 14 at the time of entry. Examples of the sensor for measuring the distance from the subject vehicle 1 to the wall 5 include sonar sensors, infrared sensors, laser sensors, radar sensors, and stereo cameras. It is not essential to estimate the driveway width X on the basis of the detection information obtained by the cameras 11 to 14 and/or the ranging device 15. For example, information on the driveway width X may be acquired, for example, by communication with the outside of the vehicle, that is, so-called road-to-vehicle communication or vehicle-to-vehicle communication. Here, as an example, the road-to-vehicle communication may be communication between the base station of the parking lot and the subject vehicle 1.

Figure 18:
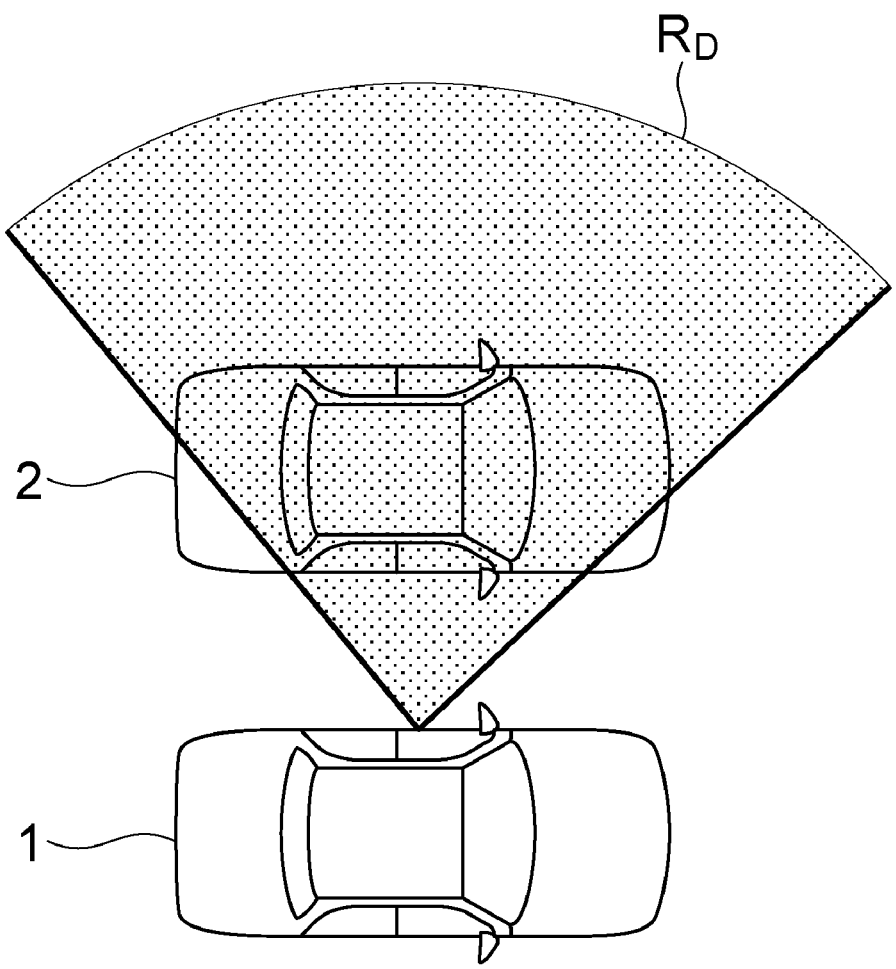
FIG. 18 is a diagram for describing a method of detecting a parked vehicle adjacent to the subject vehicle.

Referring again to FIG. 2, the surrounding object detection unit 504 detects a parked vehicle 2 adjacent to the subject vehicle 1 and outputs the detection result to the exit route generation unit 505. As an example, as illustrated in FIG. 18, the method of detecting an adjacent parked vehicle 2 may be a method of detection using the cameras 11 to 14 and/or an onboard sensor such as the ranging device 15. Examples of the onboard sensor include sonar sensors, infrared sensors, laser sensors, radar sensors, and stereo cameras. Here, as an example, the determination condition for the presence or absence of an adjacent parked vehicle 2 may be a determination condition with which, when the distance between an object entering a detection range $R_D$ of the onboard sensor and the subject vehicle 1 becomes a threshold or less, a determination is made that an adjacent parked vehicle 2 is present. The threshold in this case may be set on the basis of the distance between parked vehicles 2 in an ordinary parking lot.

Figure 19:
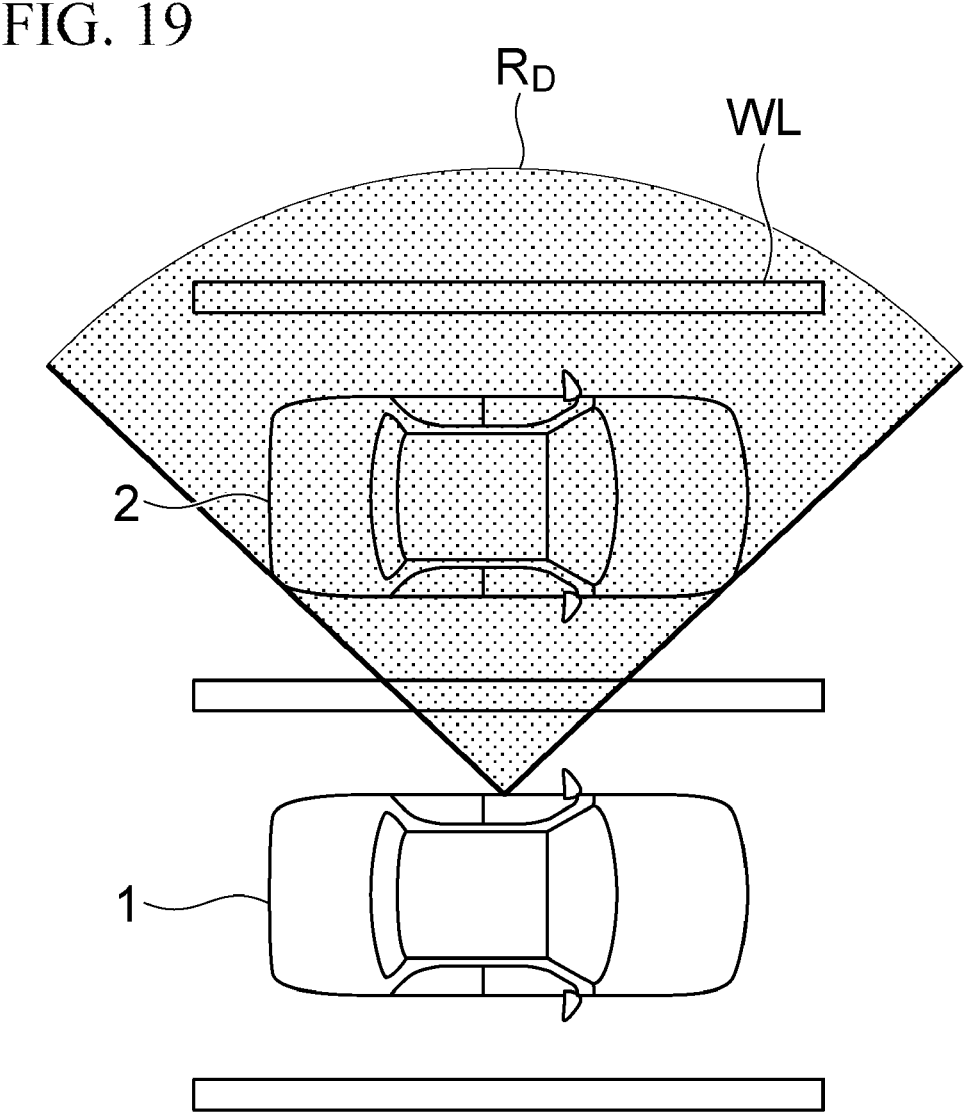
FIG. 19 is a diagram for describing a method of detecting a parked vehicle adjacent to the subject vehicle.

As an example, as illustrated in FIG. 19, the method of detecting an adjacent parked vehicle 2 may be a method of detecting the presence or absence of an adjacent parked vehicle 2 from the detection state of a white line WL on the far side of the adjacent parking frame. Here, as an example, the determination condition for the presence or absence of an adjacent parked vehicle 2 may be a determination condition with which, when the length of the detected white line WL is not more than a threshold, a determination is made that an adjacent parked vehicle 2 is present. The threshold in this case may be set to a length that is slightly shorter than the length of an ordinary white line WL.

It is not essential to detect the presence or absence of an adjacent parked vehicle 2 using an onboard sensor. For example, information on the presence or absence of an adjacent parked vehicle 2 may be acquired by communication with the outside of the vehicle, that is, so-called road-to-vehicle communication or vehicle-to-vehicle communication. Here, as an example, the road-to-vehicle communication may be communication between the base station of the parking lot and the subject vehicle 1.

Referring again to FIG. 2, the exit route generation unit 505 generates a route from the exit start position set by the exit start position setting unit 502 to the exit position set by the exit position setting unit 501 (this route will be referred to as an "exit route," hereinafter) and outputs the generated exit route to the exit route following control unit 506 and the target speed generation unit 507. In this process of generating an exit route, the exit route is calculated in accordance with the presence or absence of an adjacent parked vehicle 2 and the positional relationship between the adjacent parked vehicle 2 and the subject vehicle 1.

Figure 21:
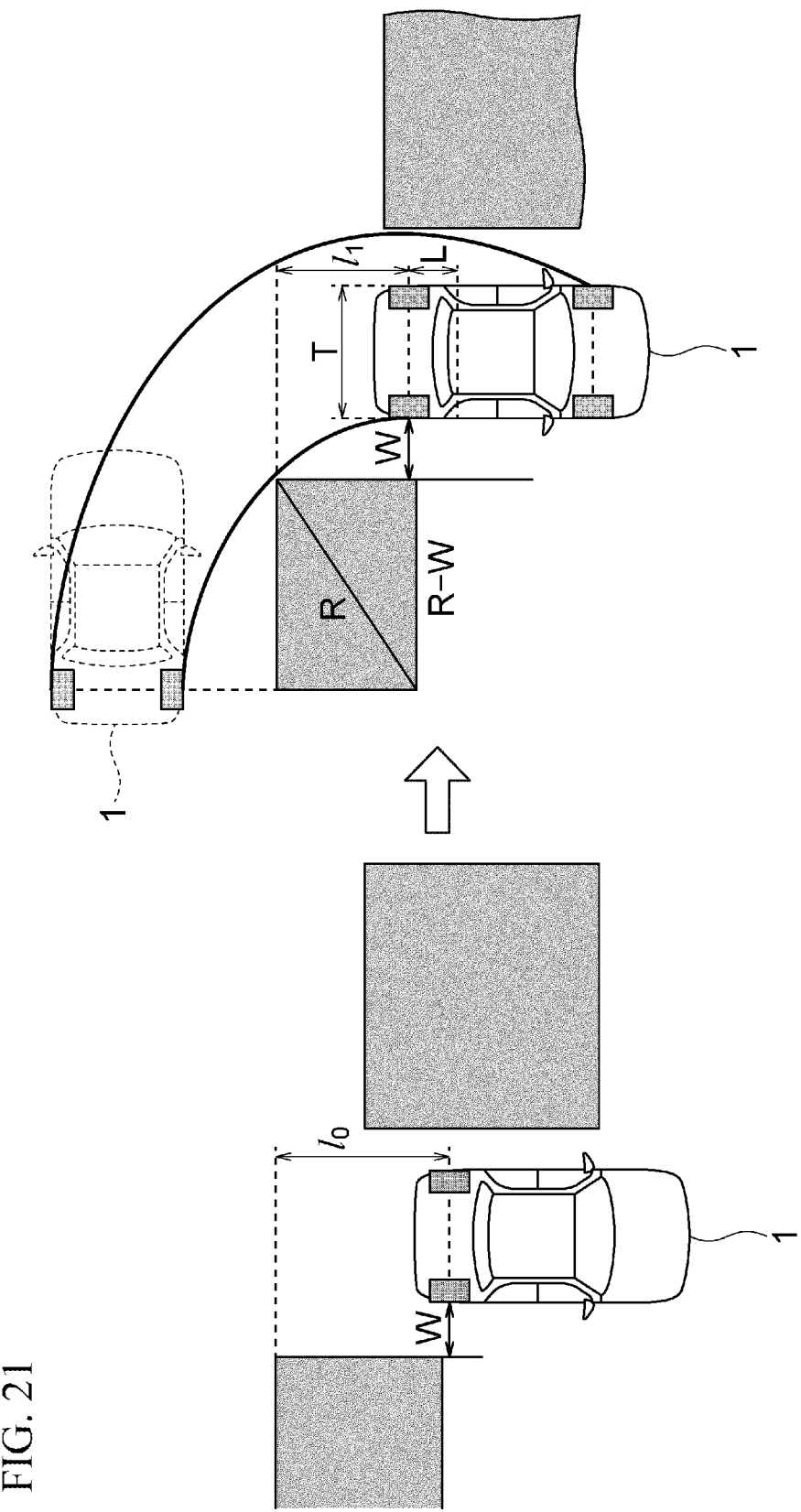
FIG. 21 is a diagram for describing a process of generating an exit route of the subject vehicle exiting backward.

FIG. 20 is a diagram for describing a process of generating an exit route of the subject vehicle 1 exiting forward, and FIG. 21 is a diagram for describing a process of generating an exit route of the subject vehicle 1 exiting backward. As illustrated in FIG. 20, when an adjacent object such as a parked vehicle is present next to the subject vehicle 1 and the subject vehicle 1 is controlled to exit forward to the side on which the adjacent object is present, an exit route is generated such that the subject vehicle 1 is controlled first to move linearly forward (this movement will be referred to as "linear movement," hereinafter) and then to turn so as not to interfere with the adjacent object.

In the situation illustrated in FIG. 20, the exit route generation unit 505 generates an exit route that satisfies the following equations (2) and (3):

[Equation 2]

$$L = l_0 - l_1 \quad (2)$$

[Equation 3]

$$l_1 = w\sqrt{\left(\frac{2R}{w} - 1\right)} \quad (3)$$

where L is a distance of a linear movement segment from the exit start position (this distance will be referred to as a "linear movement distance," hereinafter), $l_0$ is a distance from the rear wheel axle of the subject vehicle 1 located at the exit start position to the front end of the adjacent object, $l_1$ is a distance from the rear wheel axle of the subject vehicle 1, which has moved forward by L, to the front end of the adjacent object, w is a clearance between the subject vehicle 1 and the adjacent object, and R is a turning radius with reference to the rear inner wheel of the subject vehicle 1 which has moved forward by L.

As illustrated in FIG. 21, when adjacent objects such as adjacent vehicles are present on both sides of the subject vehicle 1 and the subject vehicle 1 is controlled to exit backward to the side on which one of the adjacent objects is present, an exit route is generated such that the subject vehicle 1 is controlled first to move linearly forward (this movement will be referred to as "linear movement," hereinafter) and then to turn so as not to interfere with the adjacent objects on the both sides. In such a situation, the exit route generation unit 505 calculates a route of the rear inner wheel that satisfies the above equations (2) and (3) and a route of the front outer wheel that satisfies the above equation (2) and the following equation (4):

[Equation 4]

$$l_1 = w\sqrt{(R_{FO}^2 - (R_{RO} + w)^2)}$$

$$R_{FO}^2 = l_1^2 + (R_{RO} + w)^2$$

$$R_{RO} = R + T \quad (4)$$

where T is a vehicle width of the subject vehicle 1.

Here, it is not essential to generate an exit route that includes the linear movement distance L. For example, when the subject vehicle 1 does not interfere with the adjacent objects if starting to turn from the exit start position or when no adjacent objects are present, the linear movement distance may be zero (L=0). In one or more embodiments of the present invention, when the distance between the rear wheel axle of the subject vehicle 1 located at the exit start position and the front end of the adjacent object is less than $l_1$ and when no adjacent objects are detected, the exit route generation unit 505 generates an exit route such that the linear movement distance is zero (L=0). However, if the space next to the subject vehicle 1 is a travel prohibited area or an area in which the road surface condition is poor, the exit route generation unit 505 generates an exit route that includes the linear movement distance L, as in the case in which an adjacent object is present. Examples of the area in which the road surface condition is poor include areas in which water puddle, mud, snow, ice, oil, etc. are present. By generating an exit route that does not pass through such an area, it is possible to prevent deterioration in accuracy of the exit assist due to dirt or slip of the vehicle body.

Figure 22:
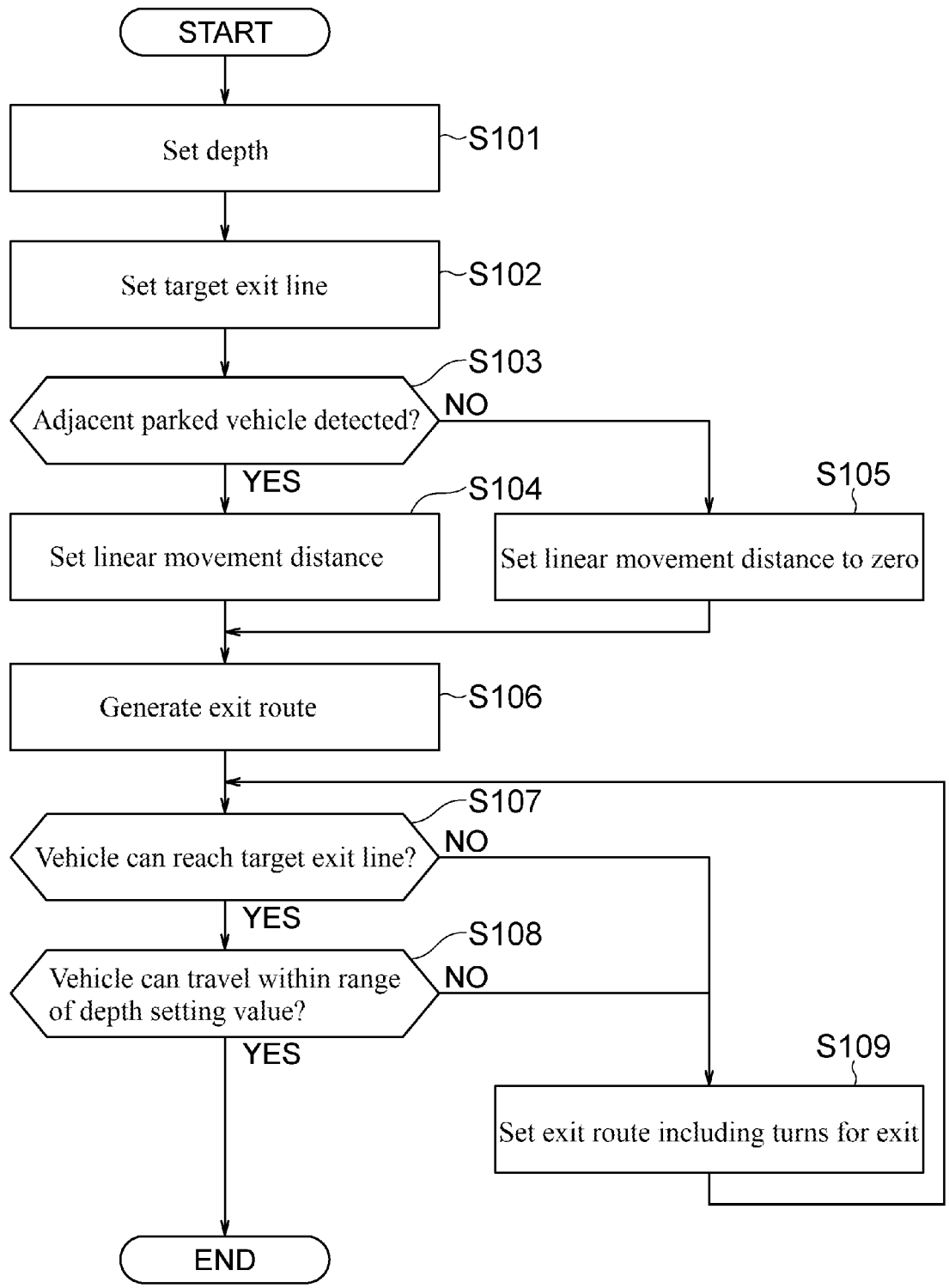
FIG. 22 is a flowchart illustrating the procedure of a process of generating an exit route.
Figure 23:
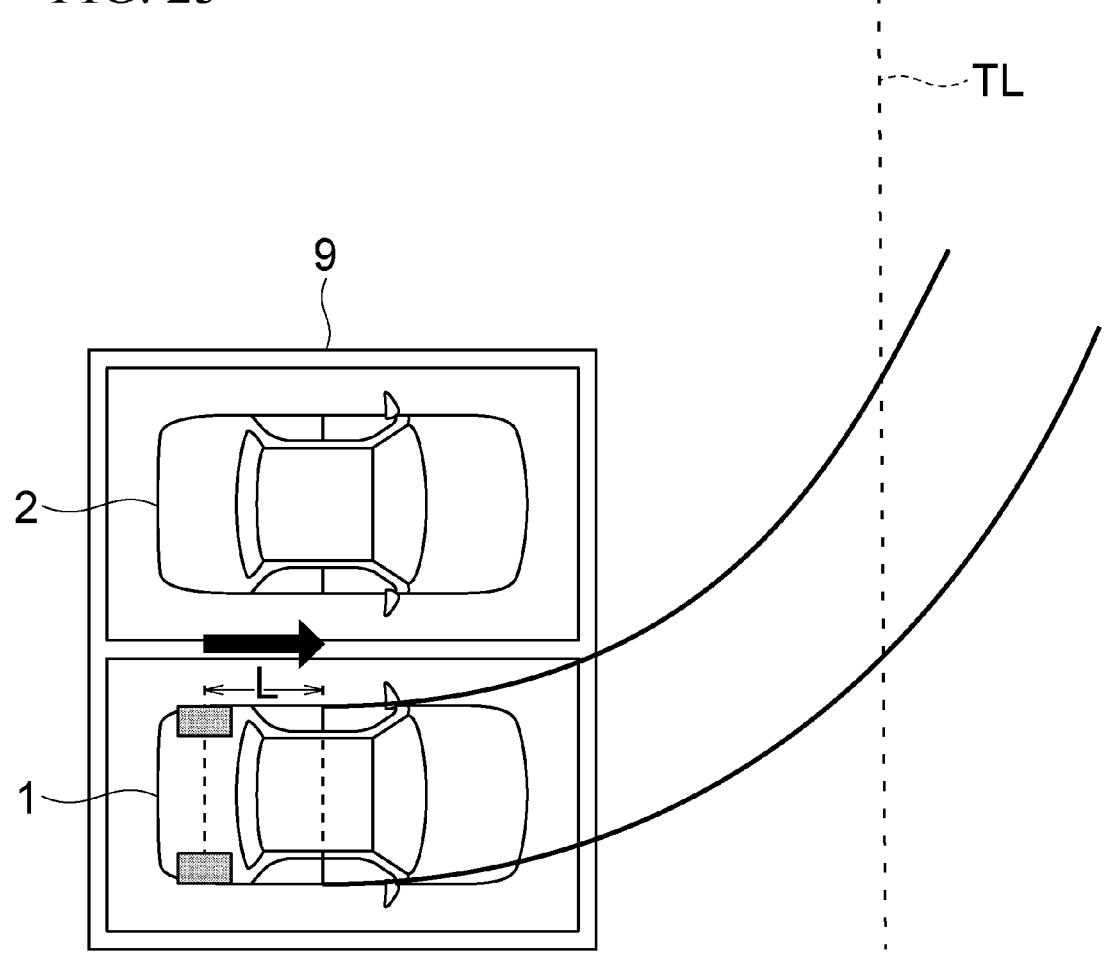
FIG. 23 is a diagram for describing the process of generating an exit route.
Figure 24:
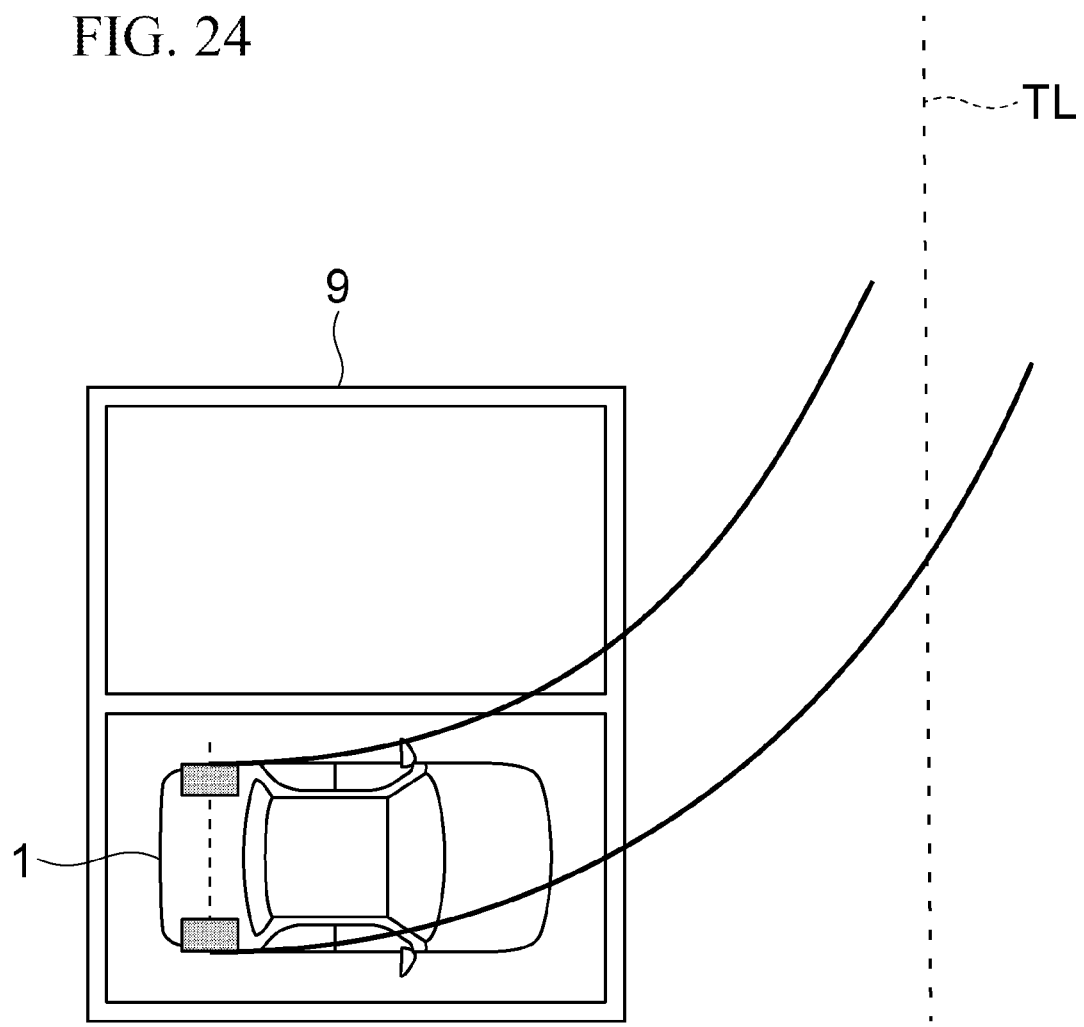
FIG. 24 is a diagram for describing the process of generating an exit route.

FIG. 22 is a flowchart illustrating the procedure of a process of generating an exit route, and FIGS. 23 and 24 are diagrams for describing the process of generating an exit route. The process of generating an exit route represented by the flowchart of FIG. 22 is started when the main switch 40 is operated and the start of exit assist is instructed, and the routine proceeds to step S101.

In step S101, the exit route generation unit 505 calculates the distance from the rear wheel axle of the subject vehicle 1 located at the exit start position to the back end portion (such as a wall or a parking frame) of the driveway for exit (this distance will be referred to as a "depth setting value," hereinafter) on the basis of the image information obtained by the cameras 11 to 14 and/or the ranging information obtained by the ranging device 15. Then, in step S102, the exit route generation unit 505 sets a target exit line TL on the driveway for exit. Examples of the target exit line TL include the center line of the driveway for exit (see FIG. 23) and the center line of a near-side driveway or a far-side driveway. The near-side driveway and the far-side driveway are obtained by dividing the driveway for exit into two in the width direction. It is not essential to execute step S101 prior to step S102, and step S102 may be executed prior to step S101.

Then, in step S103, the exit route generation unit 505 determines whether or not an adjacent parked vehicle 2 is detected by the surrounding object detection unit 504. An affirmative determination in this step is followed by step S104 while a negative determination is followed by step S105. In step S104, the exit route generation unit 505 calculates the linear movement distance L on the basis of the above equations (2) and (3) when exiting forward or on the basis of the above equations (2) to (4) when exiting backward. Depending on the positional relationship between the rear wheel axle of the subject vehicle 1 and the front end of the adjacent parked vehicle 2, the linear movement distance may be zero (L=0). On the other hand, in step S105, the exit route generation unit 505 sets the linear movement distance to zero (L=0).

Steps S104 and S105 are followed by step S106 in which the exit route generation unit 505 calculates the turning radius R on the basis of the above equations (2) and (3) when exiting forward or on the basis of the above equations (2) to (4) when exiting backward and generates an exit route in accordance with the linear movement distance L set in step S104 or S105 and the turning radius R calculated in this step.

Here, as illustrated in FIG. 23, when an adjacent parked vehicle 2 is present, the linear movement distance L and the turning radius R are set such that a clearance is formed between the turning vehicle 1 and the adjacent parked vehicle 2 to such an extent that an uncomfortable feeling is not given to the driver and passengers. When an adjacent parked vehicle 2 is present, therefore, the exit route is generated such that the subject vehicle 1 passes outside the adjacent parking space 9. On the other hand, as illustrated in FIG. 24, when no adjacent parked vehicle 2 is present, an exit route is generated such that the subject vehicle 1 passes through the adjacent parking space 9.

Referring again to FIG. 22, in step S107, the exit route generation unit 505 determines whether or not the subject vehicle 1 can reach the target exit line TL when the subject vehicle 1 is controlled to exit along the exit route generated in step S106. An affirmative determination in this step is followed by step S108 while a negative determination is followed by step S109.

In step S108, the exit route generation unit 505 determines whether or not the subject vehicle 1 can travel within the driveway width corresponding to the depth setting value set in step S101 when the subject vehicle 1 is controlled to exit along the exit route generated in step S106. An affirmative determination in this step concludes the process while a negative determination is followed by step S109.

In step S109, the exit route generation unit 505 generates an exit route that includes one or more sets of turns for exit. Then, the routine returns to step S107, and steps S107 to S109 are repeatedly executed. Here, when a negative determination is made again in step S107 or step S108, an exit route that includes two or more sets of turns for exit is generated.

As described above, in the exit assist method according to one or more embodiments of the present invention, a determination is made whether or not an adjacent parked vehicle 2 is present in an adjacent parking space 9 to the exit start position of the subject vehicle 1, and when no adjacent parked vehicle 2 is present, an exit route that includes the adjacent parking space 9 is generated (see FIG. 24). This can widen the options for the exit route as compared, for example, with the case in which a route to the parking position is recorded in the parking stage and the recorded route is set as the exit route and with the case in which the exit route is generated regardless of the presence or absence of an adjacent parked vehicle 2, such as a case of preliminarily setting the exit route.

Here, when generating an exit route that includes the adjacent parking space 9, it is possible to reduce the linear movement distance L from the exit start position and/or reduce the turning radius as compared with when generating an exit route that does not include the adjacent parking space 9. This allows the subject vehicle to readily reach the target exit line TL thereby to reduce the number of turns for exit and reduce the exit time.

It may be conceivable to employ a method of detecting an unoccupied space from available information, such as the image information obtained by a camera, and generating an exit route that passes through the unoccupied space. When this method includes detecting the unoccupied space from the image information obtained by a camera, the image information may be affected by strong sunlight and dark shadows in the daytime, insufficient illumination, backlight, and reflection of light at night, etc. It is therefore difficult to ensure the detection accuracy outdoors, and this method can only be carried out underground or indoors. Thus, depending on the surrounding environment, it may be difficult to estimate the details of an unoccupied space (such as the width and length and the presence or absence of a white line detection result) or accurately estimate an unoccupied space, and the exit route cannot be generated with a high degree of accuracy.

In contrast, in the exit assist method according to one or more embodiments of the present invention, when the presence or absence of an adjacent parked vehicle 2 is detected on the basis of the image information obtained by a camera and/or the ranging information obtained by the ranging device 15, ensuring the accuracy of detecting the presence or absence of an adjacent parked vehicle 2 is easy regardless of the surrounding brightness and the like, that is, regardless of whether the adjacent parked vehicle 2 is present outdoors or indoors. In other words, detection of the presence or absence of an adjacent parked vehicle 2 is easier than estimation of the details of an unoccupied space and accurate estimation of an unoccupied space. Thus, the space for generating the exit route can be estimated with a high degree of accuracy regardless of the surrounding environment, and the exit route can be generated with a high degree of accuracy.

In the exit assist method according to one or more embodiments of the present invention, when an adjacent parked vehicle 2 is present, the exit route is generated which includes a linear movement segment for linearly moving from the exit start position and a turning segment for turning from the end point of the linear movement segment so as not to interfere with the adjacent parked vehicle 2 (see FIG. 23). Here, the distance L of the linear movement segment is set in accordance with the width W between the adjacent parked vehicle 2 and the subject vehicle 1 (see FIGS. 20 and 21). Through this operation, when the adjacent parked vehicle 2 is present, the exit route can be generated so as not to interfere with the adjacent parked vehicle 2, while when no adjacent parked vehicle 2 is present, the exit route can be generated so as to include the adjacent parking space 9.

In the exit assist method according to one or more embodiments of the present invention, when no adjacent parked vehicle is present, the distance L of the linear movement segment is set to zero. Through this operation, when no adjacent parked vehicle 2 is present, the exit route can be generated so as to include the adjacent parking space 9.

In the exit assist method according to one or more embodiments of the present invention, when an adjacent parked vehicle 2 is present, the target exit position is set in accordance with the position of the adjacent parked vehicle 2 and the traffic direction of vehicles in the driveway for exit (see FIGS. 3 and 4). For example, as described above, when the adjacent parked vehicle 2 is present on the right side, the driveway for exit is right-side traffic, and the subject vehicle exits forward, the exit position is set on the left side. This allows for generation of the exit route which moderately curves from the exit start position to the target exit position, and the uncomfortable feeling given to the driver or passenger when exits can be alleviated.

In the exit assist method according to one or more embodiments of the present invention, a command of an operator designating the target exit position is received and the target exit position is set in accordance with the received command (see FIGS. 10 and 11). For example, as described above, the command of an operator made using the button 3L or 3R of the remote control key 3 may be received, or the command of an operator 4 may be received by detecting the motion of the operator 4. This allows the vehicle to exit to a position which the operator 4 desires, and the uncomfortable feeling given to the operator 4 can be alleviated when the vehicle exits.

In the exit assist method according to one or more embodiments of the present invention, the target exit position is set in accordance with a predetermined automatic setting condition (see FIGS. 5 to 9 and FIGS. 12 to 16). For example, the target exit position may be set such that the traffic direction of the driveway for exit and the exit direction are the same (see FIG. 5). In addition or alternatively, the target exit position may be set such that the direction of a route R to the destination, which is searched using the navigation system 70, and the exit direction are the same (see FIG. 6). In addition or alternatively, the target exit position may be set in a direction in which the number of turns for exit is small (see FIG. 9). This can alleviate the uncomfortable feeling given to the driver or passenger when exits.

In the exit assist method according to one or more embodiments of the present invention, the target exit position is set in accordance with the position of an operator performing remote control of the subject vehicle 1 (see FIGS. 12 to 14). For example, the target exit position may be set in the vicinity of the operator 4 (see FIG. 12). In addition or alternatively, the target exit position may be set to a position at which a space S can be ensured for the operator 4 to get onto the driver's seat between the door on the driver's seat side of the subject vehicle 1 and the wall 5 (see FIG. 13). In an alternative embodiment, the target exit position may be set to a position at which a space S can be ensured for the operator 4 to get onto the front passenger's seat between the door on the front passenger's seat side of the subject vehicle 1 and the wall 5 (see FIG. 14).

Figure 25:
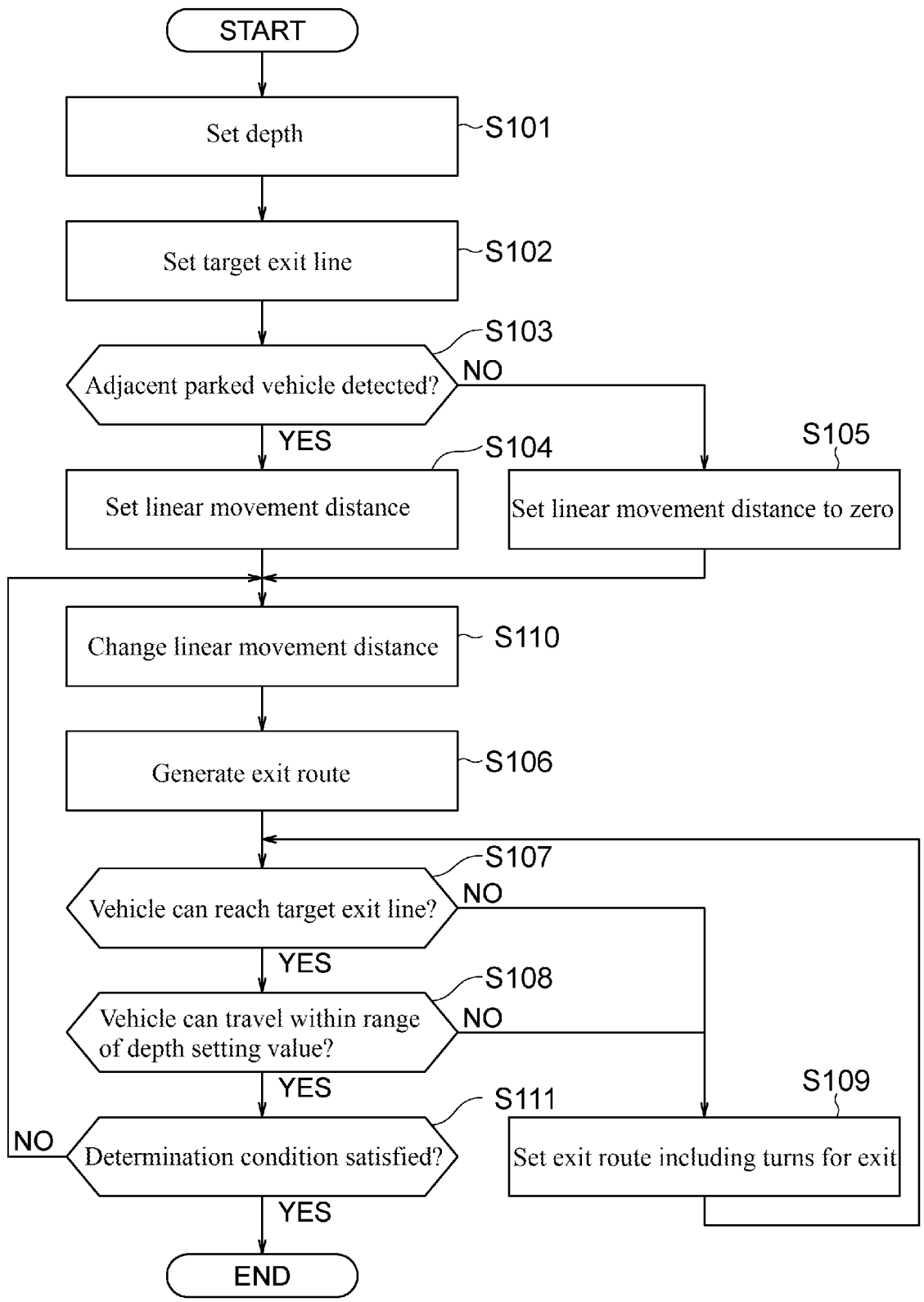
FIG. 25 is a flowchart illustrating the procedure of a process of generating an exit route according to another embodiment.

FIG. 25 is a flowchart illustrating the procedure of a process of generating an exit route according to another embodiment. The process of generating an exit route represented by the flowchart of FIG. 25 is started when the main switch 40 is operated and the start of exit assist is instructed, and steps S101 to S105 of the flowchart illustrated in FIG. 22 are executed.

Steps S104 and 105 are followed by step S110 in which the exit route generation unit 505 changes the linear movement distance L. In this step, the linear movement distance L set in step S104 or step S105 is extended. Then, in step S106, the exit route generation unit 505 calculates the turning radius R on the basis of the above equations (2) and (3) when exiting forward or on the basis of the above equations (2) to (4) when exiting backward and generates an exit route in accordance with the linear movement distance L set in step S110 and the turning radius R calculated in this step.

Then, steps S107 to S109 of the flowchart illustrated in FIG. 22 are executed. When a determination is made in step S107 that the subject vehicle can reach the target exit line and then a determination is made in step S108 that the subject vehicle can travel within a range of the depth setting value, the routine proceeds to step S111 in which the exit route generation unit 505 determines whether or not the generated exit route satisfies a predetermined determination condition. When a negative determination is made in this step, the routine returns to step S110 in which the linear movement distance L is changed again, and steps S106 to S109 and S111 are executed. On the other hand, an affirmative determination in step S111 concludes the process.

Here, the process of changing the linear movement distance L in step S110 is executed in accordance with the driveway width and/or the target exit position. For example, the wider the driveway width or the longer the distance from the exit start position to the target exit position, the linear movement distance L is made longer.

Examples of the predetermined determination condition in step S111 include a determination condition whether or not the total distance of the exit route is a predetermined distance or less and a determination condition whether or not the exit time is a predetermined time or less. As an example, the predetermined distance or time in the determination condition may be set to such a length that an uncomfortable feeling is not given to the driver and passengers or the operator who performs remote control. In an example, the loop of steps S110, S106 to S109, and S111 may be always repeated a plurality of times, and an optimum exit route may be selected on the basis of a condition such as the distance or time from among a plurality of exit routes generated during the repetition. In this case, examples of the predetermined determination condition in step S111 include a determination condition with which an exit route is selected from among the plurality of generated exit routes such that the exit route maximizes the sum of evaluation points of the distance, time, or the like.

As described above, in the exit assist method according to the present embodiment, the linear movement distance L is set in accordance with a condition of the driveway width, target exit position, or the like and the exit route is generated so as to include the set linear movement distance L and satisfy a predetermined determination condition. This allows the exit route to be generated which fits to feeling of the driver and passengers or the operator.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiments, when an adjacent parked vehicle 2 is present, an exit route that does not include the adjacent parking space 9 is generated, but this may not be essential. In one or more embodiments of the present invention, provided that the subject vehicle can turn without interfering with an adjacent parked vehicle 2, an exit route that includes the adjacent parking space 9 may be generated.

DESCRIPTION OF REFERENCE NUMERALS

1 Subject vehicle
2 Parked vehicle
9 Parking space
50 Parking and exit assist ECU
100 Parking and exit assist apparatus
L Distance of linear movement segment, or linear movement distance
W Width between subject vehicle 1 and adjacent parked vehicle 2

The invention claimed is:

1. An exit assist method executed using an exit assist controller configured to control a subject vehicle to move from an exit start position to a target exit position along an exit route, the exit assist method comprising:
determining an exit direction of the subject vehicle, wherein the exit direction is generally perpendicular to a longitudinal axis of the subject vehicle;

determining whether or not a parked vehicle is present in a parking space immediately beside the exit start position in the exit direction;

based on a determination that the parked vehicle is present in the parking space immediately beside the exit start position in the exit direction, generating the exit route of the subject vehicle that does not pass through the parking space immediately beside the exit start position in the exit direction; and based on a determination that no parked vehicle is present in the parking space immediately beside the exit start position in the exit direction, generating the exit route of the subject vehicle that passes through the parking space immediately beside the exit start position in the exit direction.

2. The exit assist method according to claim 1, wherein the exit route when the parked vehicle is present in the parking space immediately beside the exit start position in the exit direction includes a linear movement segment for linearly moving from the exit start position and a turning segment for turning from an end point of the linear movement segment so as not to interfere with the parked vehicle, and a distance of the linear movement segment is set in accordance with a distance between the parked vehicle and the subject vehicle.

3. The exit assist method according to claim 2, wherein when no parked vehicle is present in the parking space immediately beside the exit start position in the exit direction, the distance of the linear movement segment is set to zero.

4. The exit assist method according to claim 1, wherein when the parked vehicle is present in the parking space immediately beside the exit start position in the exit direction, the target exit position is set in accordance with a position of the parked vehicle and a traffic direction of vehicles in a driveway on which the target exit position is set.

5. The exit assist method according to claim 1, comprising receiving a command of an operator designating the target exit position and setting the target exit position in accordance with the received command.

6. The exit assist method according to claim 1, comprising setting the target exit position in accordance with a predetermined automatic setting condition.

7. The exit assist method according to claim 6, wherein the predetermined automatic setting condition is a condition that is set in accordance with a position of an operator performing remote control of the subject vehicle.

8. An exit assist apparatus comprising an exit assist controller configured to control a subject vehicle to move from an exit start position to a target exit position along an exit route, the exit assist controller being further configured to:

determine an exit direction of the subject vehicle, wherein the exit direction is generally perpendicular to a longitudinal axis of the subject vehicle;

determine whether or not a parked vehicle is present in a parking space immediately beside the exit start position in the exit direction;

based on a determination that the parked vehicle is present in the parking space immediately beside the exit start position in the exit direction, generate the exit route of the subject vehicle that does not pass through the parking space immediately beside exit start position in the exit direction; and based on a determination that no parked vehicle is present in the parking space immediately beside the exit start position in the exit direction, generate the exit route of the subject vehicle that passes through the parking space immediately beside the exit start position in the exit direction.

* * * * *